US008606768B2

(12) United States Patent
Mathur et al.

(10) Patent No.: US 8,606,768 B2
(45) Date of Patent: Dec. 10, 2013

(54) SYSTEM FOR PROVIDING A CONFIGURABLE ADAPTOR FOR MEDIATING SYSTEMS

(75) Inventors: Ankur Mathur, Kew (GB); Peter James Edward Daley, Berkshire (GB)

(73) Assignee: Accenture Global Services Limited, Dublin (IE)

( * ) Notice: Subject to any disclaimer, the term of this patent is extended or adjusted under 35 U.S.C. 154(b) by 683 days.

(21) Appl. No.: 11/961,822

(22) Filed: Dec. 20, 2007

(65) Prior Publication Data

US 2009/0164500 A1 Jun. 25, 2009

(51) Int. Cl.
*G06F 17/00* (2006.01)
*G06F 7/00* (2006.01)

(52) U.S. Cl.
USPC .......................... 707/703; 717/137; 709/231

(58) Field of Classification Search
USPC .................. 709/231; 717/137; 707/102, 703
See application file for complete search history.

(56) References Cited

U.S. PATENT DOCUMENTS

| 4,905,181 | A |   | 2/1990  | Gregory          |          |
|-----------|---|---|---------|------------------|----------|
| 5,179,698 | A | * | 1/1993  | Bachman et al.   | 1/1      |
| 5,195,178 | A | * | 3/1993  | Krieger et al.   | 715/809  |
| 5,793,948 | A | * | 8/1998  | Asahi et al.     | 714/47   |
| 5,812,768 | A | * | 9/1998  | Page et al.      | 709/228  |
| 6,029,174 | A | * | 2/2000  | Sprenger et al.  | 707/999.003 |
| 6,148,290 | A | * | 11/2000 | Dan et al.       | 705/304  |
| 6,167,423 | A | * | 12/2000 | Chopra et al.    | 718/100  |
| 6,456,973 | B1|   | 9/2002  | Fado et al.      |          |
| 6,671,715 | B1| * | 12/2003 | Langseth et al.  | 709/203  |
| 6,708,074 | B1| * | 3/2004  | Chi et al.       | 700/121  |
| 7,084,876 | B1| * | 8/2006  | Fogel et al.     | 345/473  |
| 7,139,713 | B2|   | 11/2006 | Falcon et al.    |          |
| 7,346,893 | B2| * | 3/2008  | Deimel et al.    | 717/121  |
| 7,392,060 | B2| * | 6/2008  | Kilian-Kehr et al. | 455/552.1 |
| 7,401,131 | B2| * | 7/2008  | Robertson et al. | 709/220  |
| 7,536,672 | B1| * | 5/2009  | Ruehle           | 717/101  |
| 7,664,816 | B2| * | 2/2010  | Heron et al.     | 709/204  |
| 7,681,184 | B1| * | 3/2010  | Weedon et al.    | 717/137  |
| 7,685,254 | B2| * | 3/2010  | Pandya           | 709/217  |
| 2002/0052932 | A1| * | 5/2002  | Curtis et al.    | 709/218  |
| 2003/0120593 | A1| * | 6/2003  | Bansal et al.    | 705/39   |
| 2003/0120665 | A1| * | 6/2003  | Fox et al.       | 707/100  |

(Continued)

OTHER PUBLICATIONS

Heuvel et al. "Configurable Adapters: The Substrate of Self-adaptive Web Services", Published on Aug. 19-22, 2007 in ICEC 2007 Conference, 2007, pp. 127-134.*

(Continued)

*Primary Examiner* — Pavan Mamillapalli
(74) *Attorney, Agent, or Firm* — Mannava & Kang, P.C.

(57) ABSTRACT

A system is described for providing a configurable adaptor for mediating systems. The system may include a memory, an interface, and a processor. The memory may store an interaction item, a data mapping, data schemas and binary representations of the data schemas. The interface may communicate with a first system, a second system, and a device. The processor may identify the interaction item describing an interaction between the systems. The processor may generate and process a first and second data schema to generate binary representations of the schemas. The processor may generate a data mapping referencing the binary representations to describe a data transformation between the data formats of the first and second systems. The processor may deploy the binary representations, the data mapping, and the interaction item to a device to enable the device to maintain interaction state, and communicate properly formatted messages between the first and second systems.

15 Claims, 37 Drawing Sheets

(56) References Cited

U.S. PATENT DOCUMENTS

| | | | | |
|---|---|---|---|---|
| 2003/0204405 | A1* | 10/2003 | Hanson et al. | 705/1 |
| 2004/0068714 | A1* | 4/2004 | Deimel et al. | 717/101 |
| 2004/0205732 | A1 | 10/2004 | Parkinson | 717/137 |
| 2006/0136570 | A1* | 6/2006 | Pandya | 709/217 |
| 2006/0155756 | A1* | 7/2006 | Stanev et al. | 707/103 R |
| 2007/0028166 | A1 | 2/2007 | Hundhausen et al. | 715/517 |
| 2007/0150480 | A1* | 6/2007 | Hwang et al. | 707/10 |
| 2008/0313116 | A1* | 12/2008 | Groble | 706/45 |

OTHER PUBLICATIONS

Extended European search report dated Feb. 17, 2009 for counterpart European Application No. 08020853.1-2211.
Nicholas F. Polys, "Stylesheet transformations for interactive visualization: towards a Web3D chemistry curricula", 3D Technologies for the World Wide Web Proceedings of the International Conference on 3D Web Technology, ACM Press, New York, NY, Mar. 9, 2003. pp. 85-90, 205.
"ClickSchedule delivering optimized scheduling for SAP", *ClickSoftware*, pp. 1-2.
"ClickSchedule for mySAP®—This is how ClickSchedule for my SAP works", *Wessendorf Software + Consulting GmbH*, 1 page, http://www.wsc-gmbh.de/en/software/clickschedule/clickschedule__2.html, last visited Sep. 14, 2007.
"ClickSchedule for mySAP®—Your ClickSchedule Advantages", *Wessendorf Software + Consulting GmbH*, 1 page, http://www.wsc-gmbh.de/en/software/clickschedule/clickschedule__3.html, last visited Sep. 14, 2007.
"ClickSchedule for mySAP®—Your ClickSchedule Advantages", *Wessendorf Software + Consulting GmbH*, 1 page, http://www.wsc-gmbh.de/en/software/clickschedule/clickschedule__1.html, last visited Sep. 14, 2007.
"ClickSchedule Powerful Scheduling At Your Fingertips", *ClickSoftware*, pp. 1-4.
"Flat file", *Wikipedia, the free encyclopedia*, pp. 1-2, http://en.wikipedia.org/wiki/Flat__file, last visited Sep. 14, 2007.
Hossari, "Gaz Metro—Advanced Scheduling Tools and Their Integration with SAP", Jul. 2004, pp. 1-28.
"Mobile workforce and field service software for wireless applications—Dexterra", *Dexterra*, pp. 1-2.
"Consultancy for mySAP®", http://www.wsc-gmbh.de/en/consulting/sap/sap__1.html, *Wessendorf Software + Consulting GmbH*, 1 page, http://www.wsc-gmbh.de/en/consulting/sap/sap__1.html, last visited Sep. 14, 2007.
"Serialization", *Wikipedia, the free encyclopedia*, pp. 1-9, http://en.wikipedia.org/wiki/Serialization, last visited Sep. 14, 2007.
"XML Solutions", pp. 1-2, http://www.selectbs.com/solutions/xml-for-data-exchange.htm, last visited Sep. 14, 2007.

* cited by examiner

CONNECTTaskDispatchResultDispatchedTasksDispatchedTaskTask
Class

CONNECTTaskDispatchResultDispatchedTasksDispatchedTask
Class

CONNECTTaskDispatchResultCTProfile
Class

CONNECTTaskDispatchResult
Class

CONNECTTaskDispatchResultDispatchedTasksDispatchedTaskTaskCableBearerDetailsCableBearerDetail
Class CONNECTTaskDispatchResultDispatchedTasksDispatchedTaskTaskECCRatesECCRate
Class CONNECTTaskDispatchResultDispatchedTasksDispatchedTaskGPSCoordinates
Class CONNECTTaskDispatchResultDispatchedTasksDispatchedTaskTaskPreWire
Class CONNECTTaskDispatchResultDispatchedTasksDispatchedTaskTaskProductsAndEquipmentProductAndEquipm...
Class CONNECTTaskDispatchResultDispatchedTasksDispatchedTaskTaskPreWireTerminationDetailsPreWireTermin...
Class CONNECTTaskDispatchResultDispatchedTasksDispatchedTaskTaskHistoryFaultHistory
Class CONNECTTaskDispatchResultError
Class CONNECTTaskDispatchResultMessages
Message
Class CONNECTTaskDispatchResultDispatchedTasksDispatchedTaskAssignment
Class

FIG. 26

Assignment
Class
- Fields
  - _apointmentTime...
  - _apointmentTime...
  - _assignmentID
  - _assignmentOffset
  - _comments
  - _dueDate
  - _earliestStart
  - _estimatedDurati...
  - _lateStart
  - _naType
  - _scheduledAssign...
  - _scheduledAssign...
  - _startPoint
  - _taskIDFK
  - _w6Key
- Properties
  - ApointmentTimeS...
  - ApointmentTimeS...
  - AssignmentID
  - AssignmentOffset
  - Comments
  - DueDate
  - EarliestStart
  - EstimatedDuration
  - LateStart
  - NaType
  - ScheduledAssign...
  - ScheduledAssign...
  - StartPoint
  - TaskIDFK
  - W6Key

CableBearer
Class
- Fields
  - _action
  - _bearerDetailCo...
  - _cable
  - _cableBearerID
  - _cableDiameter
  - _cableLength
  - _circuitLoss
  - _jumperRequired
  - _noOfWires
  - _plantDetails
  - _plantPart
  - _plantType
  - _route
  - _routeResistance
  - _routeSlope
  - _taskIDFK
- Properties
  - Action
  - BearerDetailCom...
  - Cable
  - CableBearerId
  - CableDiameter
  - CableLength
  - CircuitLoss
  - JumperRequired
  - NoOfWires
  - PlantDetails
  - PlantPart
  - PlantType
  - Route
  - RouteResistance
  - RouteSlope
  - TaskIDFK

FIG. 27B

CT
Class
- Fields
  - _costCenter
  - _ctID
  - _ctToolktVersion
  - _dispatchAssign…
  - _dispatchMessages
  - _dispatchNewAss…
  - _eodFlag
  - _integralCTID
  - _overtimeFlag
  - _referenceDataV…
  - _revisedEODDtm
  - _revisedSODDtm
  - _rosteredEODDtm
  - _rosteredSODDtm
  - _timezoneOffset
- Properties
  - CostCenter
  - CtID
  - CtToolktVersion
  - DispatchAssignm…
  - DispatchMessages
  - DispatchNewAssi…
  - EodFlag
  - IntegralCTID
  - OvertimeFlag
  - ReferenceDataVe…
  - RevisedEODDtm
  - RevisedSODDtm
  - RosteredEODDtm
  - RosteredSODDtm
  - TimezoneOffset

Prewire
Class
- Fields
  - _buildingType
  - _constructionStage
  - _internalCable1
  - _internalCable2
  - _internalCable3
  - _pointsMarked
  - _prewireID
  - _prewireRequired
  - _taskIDFk
  - _trenchCable1
  - _trenchCable2
  - _trenchCable3
  - _trenchingLength
  - _trenchingProvider
  - _trenchingRequired
  - _visitTypeIndicator
- Properties
  - BuildingType
  - ConstructionStage
  - InternalCable1
  - InternalCable2
  - InternalCable3
  - PointsMarked
  - PrewireID
  - PrewireRequired
  - TaskIDFk
  - TrenchCable1
  - TrenchCable2
  - TrenchCable3
  - TrenchingLength
  - TrenchingProvider
  - TrenchingRequired
  - VisitTypeIndicator

FIG. 27C

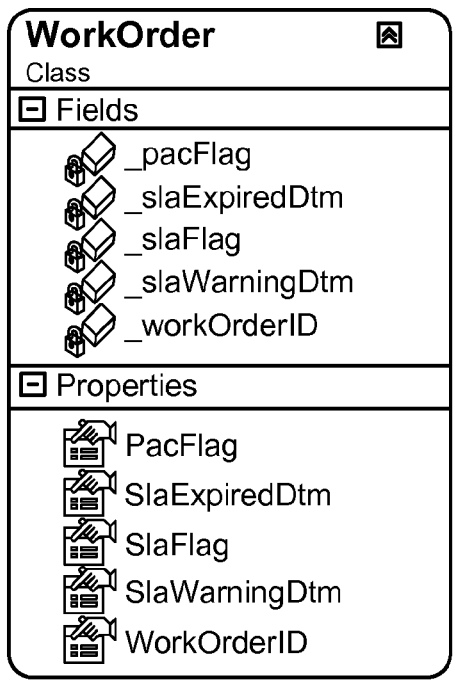
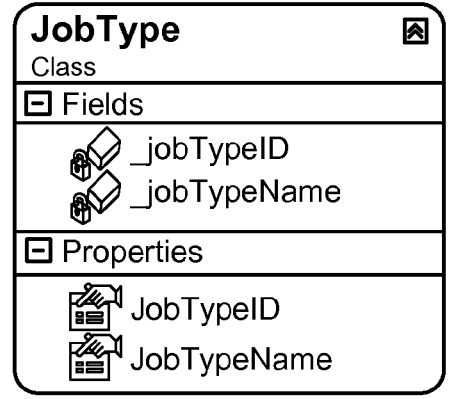
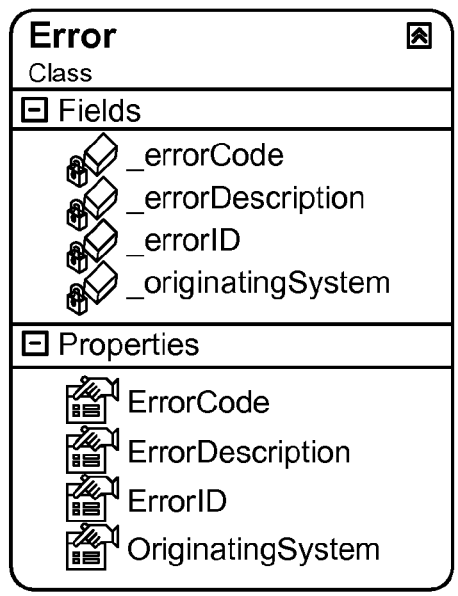
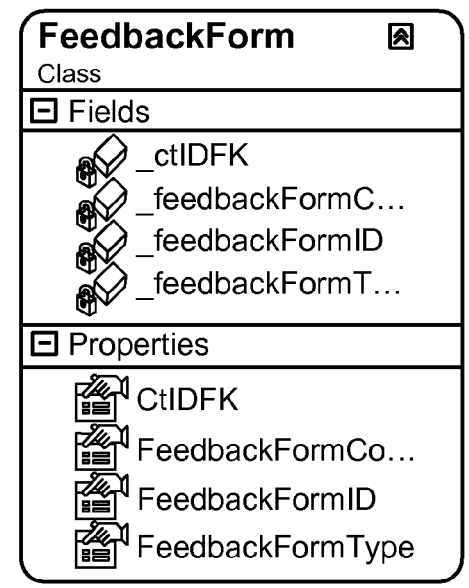
FIG. 27G

| WebMethod Name | Collection | Connect <XML> Tag |
|---|---|---|
| SELECT XML Messages | | |
| Begin[Get|Set]ConnectTaskDispatch[Result]_Select | -- | -- |
| [Get]ConnectDispatchedTask_Select | YES | <Task> |
| [Get]ConnectTaskIdentity_Select | YES | <Task> |
| [Get]ConnectCTProfile_Select | YES | <CTProfile> |
| [Get]ConnectCableBearer_Select | YES | <CableBearerDetail> |
| Get]ConnectCustomer_Select | YES | <Task> |
| [Get]ConnectPreWire_Select | YES | <PreWire> |
| [Get|Set]ConnectPreWireTermination_Select | YES | <PreWireTermination> |
| Get]ConnectProject_Select | YES | <Task> |
| [Get]ConnectProductAndEquipment_Select | YES | <ProductAndEquipment> |
| [Get]ConnectECCRate_Select | YES | <ECCRate> |
| Get]ConnectLine_Select | YES | <Task> |
| Get]ConnectExchange_Select | YES | <Task> |
| [Get]ConnectHistory_Select | YES | <History> |
| [Get]ConnectAssignment_Select | YES | <Assignment> |
| [Get]ConnectGPSCoordinates_Select | YES | <GPSCoordinates> |
| [Get]ConnectContact_Select | YES | <Task> |
| [Get]ConnectWorkOrder_Select | YES | <Task> |
| [Get]ConnectMessage_Select | YES | <Message> |
| [Get]Error_Select (only present if error occurs) | YES | <Error> |
| End[Get|Set]ConnectTaskDispatch[Result]_Select | -- | -- |
| UPDATE XML Messages | | |
| Begin[Get|Set]ConnectTaskDispatch[Result]_Update | -- | -- |
| [Get|Set]ConnectDispatchedTask_Update | NO | <DispatchedTask> |
| [Get|Set]ConnectCTProfile_Update | NO | <CTProfile> |
| [Get|Set]ConnectCableBearerDetail_Update | YES | <CableBearerDetail> |
| [Get|Set]ConnectPreWire_Update | NO | <PreWire> |
| [Get|Set]ConnectPreWireTermination_Update | YES | <PreWireTermination> |
| [Get|Set]ConnectProductAndEquipment_Update | YES | <ProductAndEquipment> |
| [Get|Set]ConnectECCRate_Update | YES | <ECCRate> |
| [Get|Set]ConnectFaultHistory_Update | YES | <FaultHistory> |
| [Get|Set]ConnectAssignment_Update | NO | <Assignment> |
| [Get|Set]ConnectGPSCoordinates_Update | NO | <GPSCoordinates> |
| [Get|Set]ConnectMessage_Update | YES | <Message> |
| [Get|Set]Error_Update (only present if error occurs) | YES | <Error> |
| End[Get|Set]ConnectTaskDispatch[Result]_Update | -- | -- |

FIG. 29

| WebMethod Name | Collection | Connect <XML> Tag |
|---|---|---|
| SELECT XML Messages | | |
| Begin[Get\|Set]ConnectNonTaskUpdate_Select | -- | -- |
| [Get\|Set]ConnectCTProfile_Select | NO | <CTProfile> |
| [Get\|Set]ConnectMaterial_Select | YES | <Material> |
| [Get\|Set]ConnectManhour_Select | YES | <Manhour> |
| [Get\|Set]Error_Select | YES | <Error> |
| End[Get\|Set]ConnectNonTaskUpdate_Select | -- | -- |
| UPDATE XML Messages | | |
| Begin[Get\|Set]ConnectNonTaskUpdate_Update | -- | -- |
| [Get\|Set]ConnectCTProfile_Update | NO | <CTProfile> |
| [Get\|Set]ConnectMaterial_Update | YES | <Material> |
| [Get\|Set]ConnectManhour_Update | YES | <Manhour> |
| [Get\|Set]Error_Update | YES | <Error> |
| End[Get\|Set]ConnectNonTaskUpdate_Update | -- | -- |

FIG. 30

SYSTEM FOR PROVIDING A CONFIGURABLE ADAPTOR FOR MEDIATING SYSTEMS

TECHNICAL FIELD

The present description relates generally to a system and method, generally referred to as a system, for providing a configurable adaptor for mediating systems, and more particularly, but not exclusively, to building a configurable adaptor for mediating communications between a mobile application system and a backend scheduling system.

BACKGROUND

Enterprise systems may be built with component systems from several distinct vendors. The systems of each vendor may implement a unique messaging system. In some cases the uniqueness of the messaging systems may result in one or more of the component systems being unable to communicate with another component system. The communication between these systems may be facilitated by a third party adaptor; however, if no third party adaptor exists the component systems may be rendered incompatible.

A proprietary adaptor may be developed to facilitate the communication between the incompatible systems; however, the developed adaptor may be limited to the particular implementation and function of the enterprise system. If the business logic or data schema of any of the component systems were to change the adaptor may be rendered inoperable or may have to be re-developed. In addition the proprietary adaptor may not be re-usable, that is the adaptor may be limited to the business logic and data schema of the particular implementation and may be inoperable in other implementations.

SUMMARY

A system for providing a configurable adaptor for mediating systems may include a memory, an interface, and a processor. The memory may be connected to the processor and the interface and may store an interaction item including a plurality of states, a data mapping describing a data transformation, a first data schema, a second data schema, a first binary representation of the first data schema, and a second binary representation of the second data schema. The interface may be connected to the memory and the processor and may be operative to communicate with a first system, a second system, and a device. The processor may be connected to the memory and the interface and may be operative to identify the interaction item describing an interaction between the first system and the second system. The interaction item may include a plurality of states and the processor may store the interaction item in the memory. The processor may generate the first data schema describing a first data format of the first system and a second data schema describing a second data format of the second system. The processor may process the first data schema and the second data schema to generate a first binary representation of the first schema and a second binary representation of the second schema. The processor may generate the data mapping wherein the data mapping references the first binary representation and the second binary representation to describe a data transformation between the first data format and the second data format. The processor may deploy the first binary representation, the second binary representation, the data mapping and the interaction item to a device to enable the device to maintain a proper state of an interaction between the first system and the second system, and enable the device to send and receive properly formatted messages between the first system and the second system.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 26 is an illustration of class objects used in an implementation of the systems of FIG. 1, FIG. 2, and FIG. 3, or other systems for providing a configurable adaptor for mediating systems.

FIGS. 27A-H are illustrations of the class objects used in an implementation of the systems of FIG. 1, FIG. 2, and FIG. 3, or other systems for providing a configurable adaptor for mediating systems.

FIG. 29 is a table listing the messages used to interact with data in an implementation of the systems of FIG. 1, FIG. 2, and FIG. 3, or other systems for providing a configurable adaptor for mediating systems.

FIG. 30 is a table listing the messages used to interact with data in an implementation of the systems of FIG. 1, FIG. 2, and FIG. 3, or other systems for providing a configurable adaptor for mediating systems.

DETAILED DESCRIPTION

A system and method, generally referred to as a system, may relate to providing a configurable adaptor for mediating systems, and more particularly, but not exclusively, to building a configurable adaptor for mediating communications between a mobile application system and a backend scheduling system. The principles described herein may be embodied in many different forms.

The system may facilitate the deployment of an enterprise system utilizing several systems with distinct messaging systems. An enterprise system may include one or more individual systems, and each individual system may be referred to as a component system of the enterprise system. If one or more of the systems, such as a work management system, a mobile system, a human resources system, and a graphical information system, are unable to communicate an adaptor may easily be built, using a simple interface, such as a graphical interface, to allow the systems to communicate properly. Once an adaptor has been built the adaptor may be re-configured on-the-fly to adapt to changes in the underlying data schemas or the data mapping. A user may be able to utilize a simple interface to make adjustments to the adaptor to reflect changes to the underlying data schema or data mapping. The adaptor may not need be recompiled for changes to the data schema or the data mapping to take effect. In addition, the adaptor may be re-configured to adjust to underlying changes in the business logic or the interactions between the systems.

An adaptor built by the system may provide a higher messaging throughput and may more efficiently transform messages than traditional adaptors. The flexibility of the adaptor may allow an organization to implement an instance of the adaptor and use the simple interface to handle updates to the underlying business logic and data schema without requiring the assistance of a third party to make the modifications or recompile the software. Eliminating the need for third party assistance for system updates may reduce the costs associated with system updates and may enable organizations to dynamically update business processes at market speed.

Figure 1:
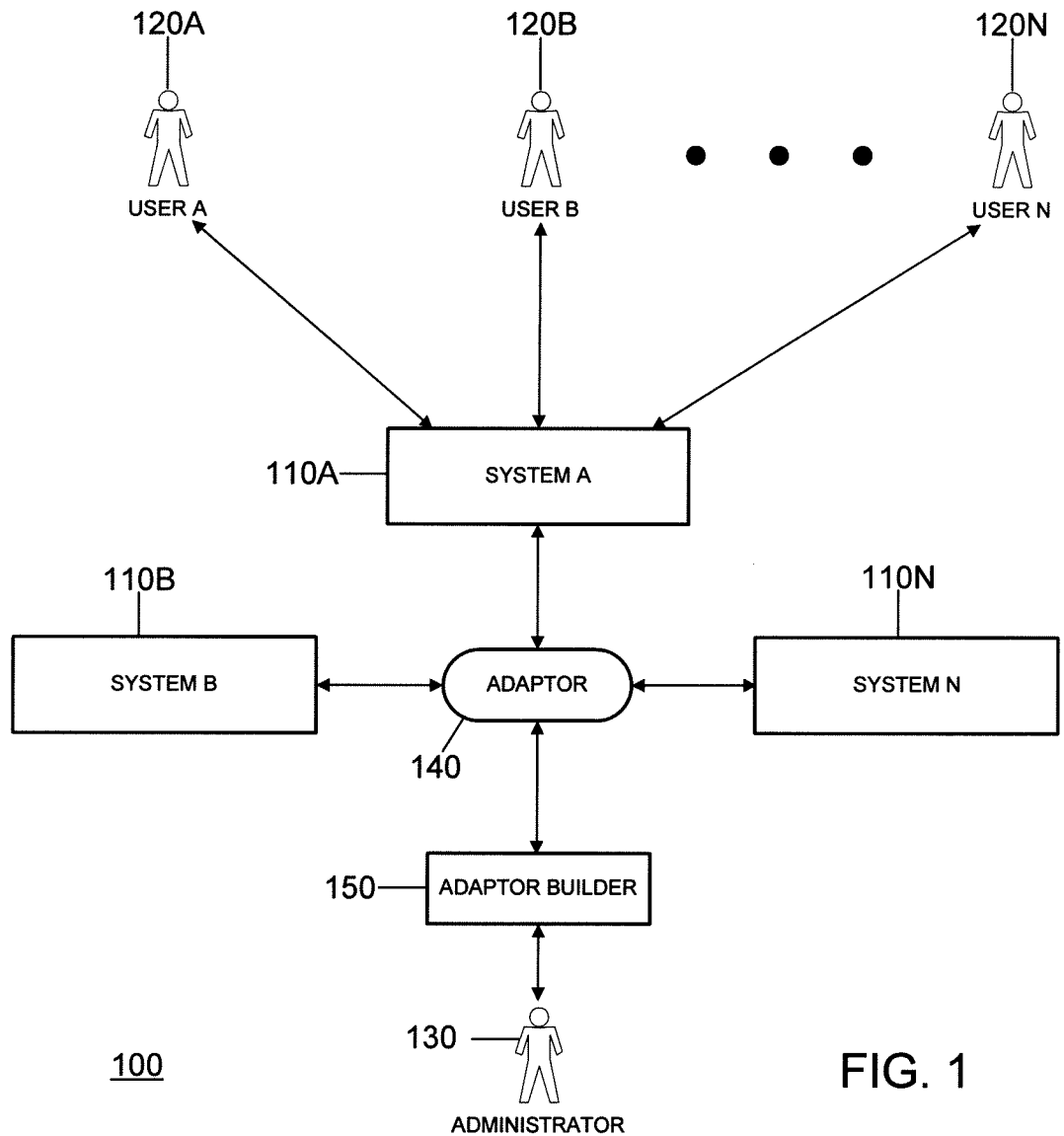
FIG. 1 is a block diagram of a general overview of a system for providing a configurable adaptor for mediating systems.

FIG. 1 provides a general overview of a system 100 for providing a configurable adaptor for mediating systems. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more systems 110A-N, such as component systems of an enterprise system, an adaptor 140, an adaptor builder 150, an administrator 130, such as an administrative user of the enterprise system, and one or more users 120A-N, such as end users of the enterprise system. The components may communicate using hierarchical Extensible Markup Language ("XML") messages, flat files, serialized objects, or generally any mode of communicating data. The administrator 130 may use the adaptor builder 150 to build, configure and modify the adaptor 140. The adaptor 140 may mediate the communications between the systems 110A-N. The adaptor 140 may maintain the state of the transactions between the systems 110A-N and may maintain the business logic associated with the transactions. If the underlying data schema or business logic of one or more of the systems 110A-N changes the administrator may use the adaptor builder 150 to quickly reflect the changes in the adaptor 140.

In operation the administrator 130 may use an interface provided by the adaptor builder 150, such as a web interface, or Microsoft Visual Studio, to identify an interaction between one or more systems 110A-N which may not be able to communicate properly, such as the system A 110A and the system B 110B. The administrator may use the interface to layout the various steps, or states, of the business logic underlying the interaction. Interactions may include uploading data from the system A 110A to the system B 110B, downloading data from the system A 110A to the system B 110B, or generally any flow of data between the systems 110A-N. For example the steps may include receiving a message from system A 110A and awaiting a response from system B 110B and/or system N 110N. Once the business logic of an interaction has been identified the adaptor builder 150 may compile the data representing the interaction in to binary code. Alternatively or in addition the data representing the interaction may be compiled into an XML file with an element representing each step in the interaction.

Once the business logic of the interaction has been identified, the administrator 130 may use a simple interface provided by the adaptor builder 150, such as a web interface, to identify the data schemas of the system A 110A and the system B 110B. The administrator 130 may also use a simple interface provided by the adaptor builder 150, such as a web interface, to identify the data schemas of the system A 110A and the system B 110B. The adaptor builder 150 may generate an Extensible Stylesheet Language Transformation ("XSLT") file to represent the data schemas of each component identified by the administrator 130. The adaptor builder 150 may generate an individual XSLT file for each data schema in the system 100. Alternatively or in addition, the administrator 130 may use an XML tool, such as ALTOVA XML SPY®, to create an XSLT file describing the data transformation. Alternatively or in addition the adaptor builder 150 may generate a file in other formats to describe the data schemas, such as an XML file, a flat file, a comma delimited file, or generally any file capable of describing a data transformation.

The XSLT files may then be parsed and compiled by proprietary components, to generate a set of binary class objects into a dynamically linked library ("DLL") files. One DLL file may be generated for each component in the system. The compilation of the XSLT file may include generating a class object for each data item and generating a method to retrieve the data item and a method to update the data item. Since the class objects are in binary form they may be able to update or retrieve data more efficiently, and in turn enable a more efficient transformation of data, than the XSLT files.

Once the interaction and the data schema files have been determined the administrator 130 may use a simple interface provided by the adaptor builder 150, such as a web interface, to map out the data layouts between the systems 110A-N associated with the interaction. The data layout mapping may represent the transformation necessary to reformat a message from a format used by the system A 110A to a format used by the system B 110B, or vice-versa. The adaptor builder 150 may generate an XML file to represent the data mapping identified by the administrator 130. The adaptor builder 150 may generate an individual XSLT file for each data mapping in the system 100. Alternatively or in addition, the administrator 130 may use an XML tool, such as ALTOVA XML SPY®, to create an XSLT file describing the data transformation. Alternatively or in addition the adaptor builder 150 may generate a file in other formats to describe the data transformation, such as an XML file, a flat file, a comma delimited file, or generally any file capable of describing a data transformation.

The adaptor builder 150 may transfer the binary code representing the business logic, the class objects representing the data schema and the XML file representing the data mappings to the adaptor 140. The adaptor 140 may then be capable of maintaining the state of an interaction between one or more systems 110A-N and may be able to transform data between one or more systems 110A-N.

If the if the data schema of any of the associated systems 110A-N changes, the administrator 130 may use the interface provided by the adaptor builder 150 to update the adaptor 140. The administrator 130 may use the interface provided by the adaptor builder 150 to modify the data schema XSLT files as necessary. The adaptor builder 150 may load the data from the XSLT file into the interface to allow the administrator 130 to view and modify the data schemas. Once the data schemas have been updated the adaptor builder 150 may generate updated XSLT files from the updated data schemas. Alternatively or in addition the XSLT files may be updated instead of being re-generated. The updated XSLT files may be processed to generate updated DLL files and the DLL files may be deployed to the adaptor 140 for a seamless update of the enterprise system. Alternatively or in addition, the administrator 130 may use an XML tool, such as ALTOVA XML SPY®, to modify the XSLT file describing the data schemas.

If the if the data mapping of the schema changes, the administrator 130 may use the interface provided by the adaptor builder 150 to update the adaptor 140. The administrator 130 may use the interface provided by the adaptor builder 150 to modify the data mapping XML file as necessary. The adaptor builder 150 may load the data from the XML file into the interface to allow the administrator 130 to view and modify the data mapping. Once the data mapping has been updated the adaptor builder 150 may generate updated an XML file from the updated data mapping. Alternatively or in addition the XML file may be modified instead of being re-generated. The updated XML files may be deployed to the adaptor 140 for a seamless update of the enterprise system. Alternatively or in addition, the administrator 130 may use an XML tool, such as ALTOVA XML SPY®V, to modify the XML file describing the data mapping.

In the case of the underlying business logic being represented by an XML file, the administrator 130 may use the interface provided by the adaptor builder 150 to update the steps, or states, of the business logic. The adaptor builder 150 may load the data from the XML file to the interface to allow the administrator 130 to view and modify the business logic. Once the administrator 130 updates the business logic the adaptor builder 150 may generate the XML file representing the steps of the interaction. The XML file may then be deployed on the adaptor 140 for a seamless update. Alternatively or in addition, the administrator 130 may use an XML tool, such as ALTOVA XML SPY®, to update the XML file representing the business logic. The steps of updating the business logic may be found in more detail in FIG. 8 below.

Figure 2:
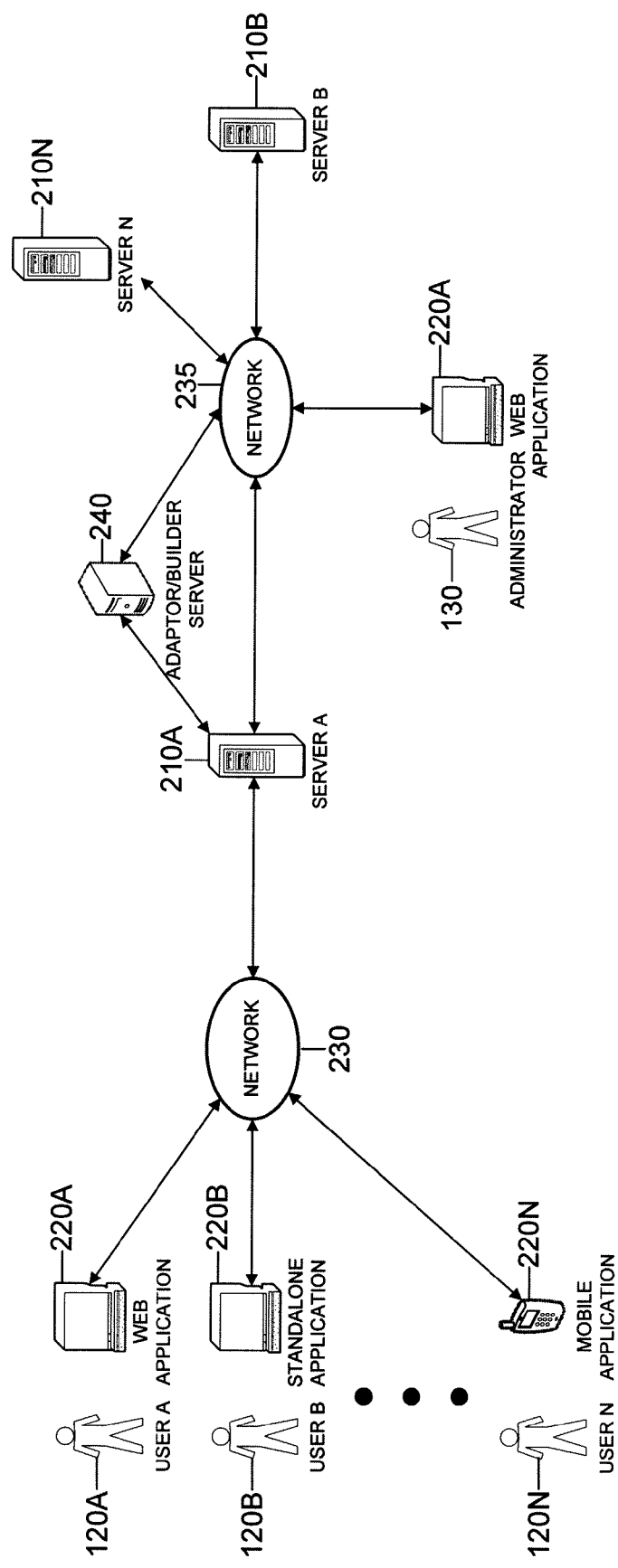
FIG. 2 is a block diagram of a network environment implementing the system of FIG. 1 or other systems for providing a configurable adaptor for mediating systems.

FIG. 2 provides a simplified view of a network environment 200 implementing the system of FIG. 1 or other systems for providing a configurable adaptor for mediating systems. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more servers 210A-N, and one or more web applications, standalone applications, mobile applications 220A-N, which may collectively be referred to as client applications for the users 120A-N, or individually as a user client application. Each server 210A-N may represent one or more component systems. The network environment 200 may also include a network 230, a network 235, an adaptor/builder server 240, and an administrator 130.

Some or all of the adaptor/builder server 240 and the servers 210A-N may be in communication with each other by way of network 235. The servers 210A-N and the adaptor/builder server 240 may each represent multiple linked computing devices. The adaptor/builder server 240 may include the adaptor 140 and the adaptor builder 150. Alternatively or in addition the adaptor 140 and the adaptor builder 150 may reside on two separate machines. The administrator 130 may use a web application 220A to interface with the adaptor/builder server 240. Alternatively or in addition the administrator may use a mobile application 220N or a standalone application 220B to interface with the adaptor/builder server 240.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The servers 210A-N may communicate with the adaptor/builder server 240 via the networks 230, 235. The servers 210A-N may communicate with the users 120A-N via the networks 230, 235, through the web applications, standalone applications or mobile applications 220A-N. Alternatively or in addition only one of the servers 210A-N may be in direct communication with the users 120A-N, such as the server A 210A.

The web applications, standalone applications and mobile applications 220A-N, and servers 210A-N, may be connected to the network 230 in any configuration that supports data transfer. This may include a data connection to the network 230 that may be wired or wireless. Any of the web applications, standalone applications and mobile applications 220A-N may individually be referred to as a client application. The web application 220A may run on any platform that supports web content, such as a web browser or a computer, a mobile phone, personal digital assistant (PDA), pager, network-enabled television, digital video recorder, such as TIVO®, automobile and/or any appliance or platform capable of data communications.

The standalone application 220B may run on a machine that may have a processor, memory, a display, a user interface and a communication interface. The processor may be operatively connected to the memory, display and the interfaces and may perform tasks at the request of the standalone application 220B or the underlying operating system. The memory may be capable of storing data. The display may be operatively connected to the memory and the processor and may be capable of displaying information to the user B 120B. The user interface may be operatively connected to the memory, the processor, and the display and may be capable of interacting with a user B 120B. The communication interface may be operatively connected to the memory, and the processor, and may be capable of communicating through the networks 230, 235 with the component servers 210A-N. The standalone application 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, amongst others.

The mobile application 220N may run on any mobile device that may have a data connection. The data connection may be a cellular connection, a wireless data connection, an internet connection, an infra-red connection, a Bluetooth connection, or any other connection capable of transmitting data.

The adaptor/builder server 240 and servers 210A-N may include one or more of the following: an application server, a mobile application server, a data store, a database server, and a middleware server. The adaptor/builder server 240 may exist on one machine or may be running in a distributed configuration on one or more machines.

Figure 25:
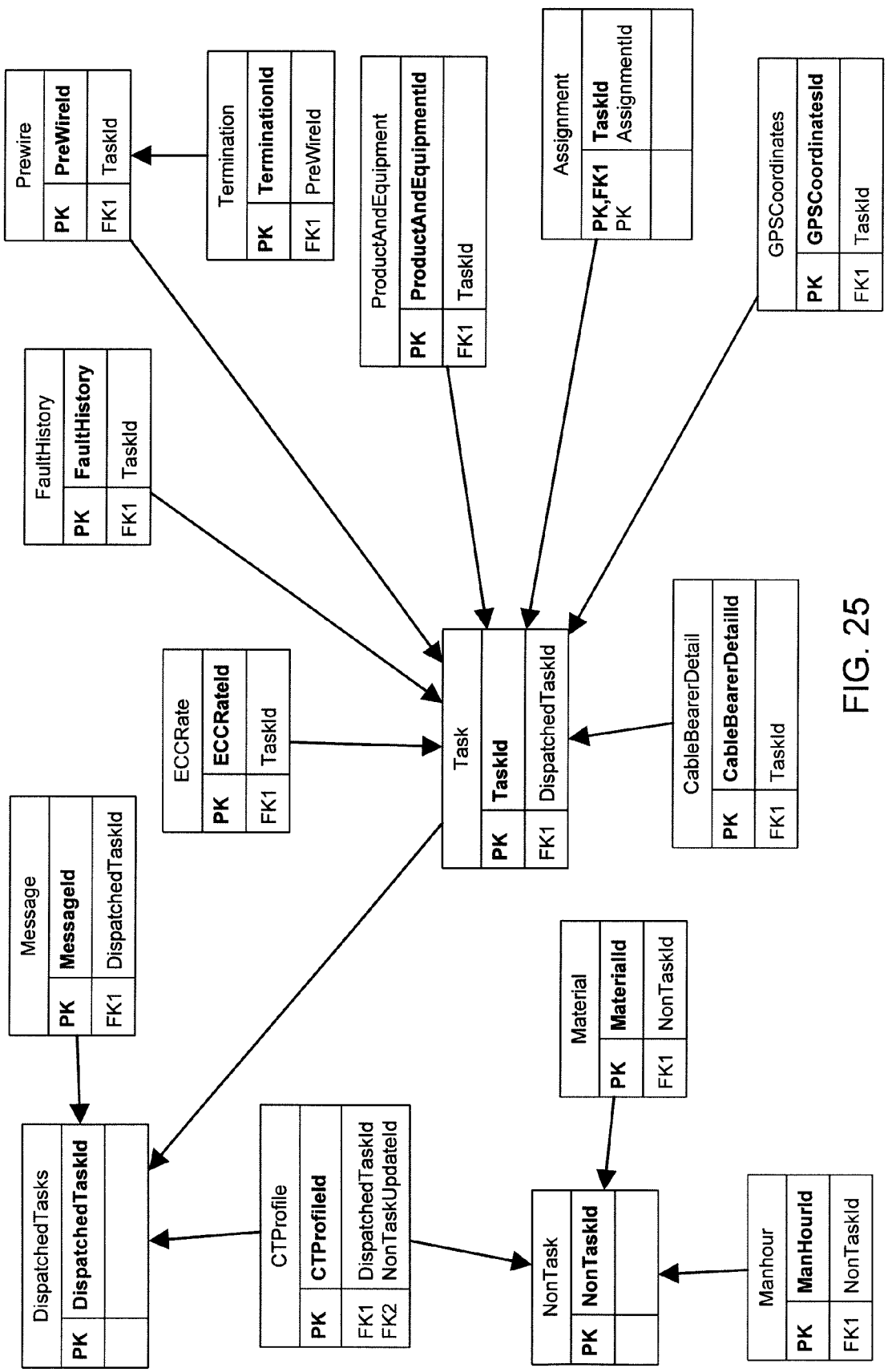
FIG. 25 is a data layout illustrating a database layout in an implementation of the systems of FIG. 1, FIG. 2, and FIG. 3, or other systems for providing a configurable adaptor for mediating systems.
Figure 27A:
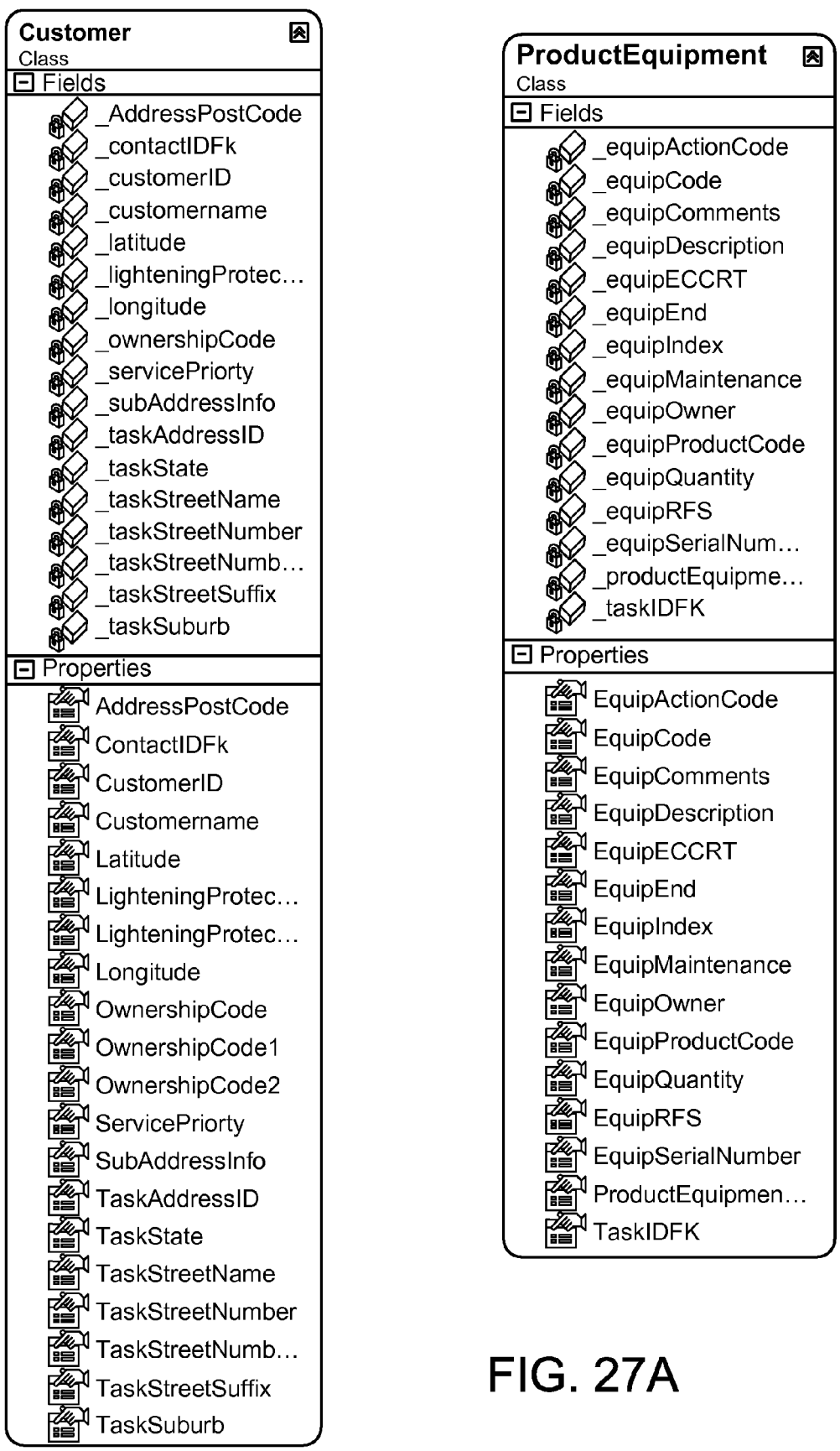
Figure 27D:
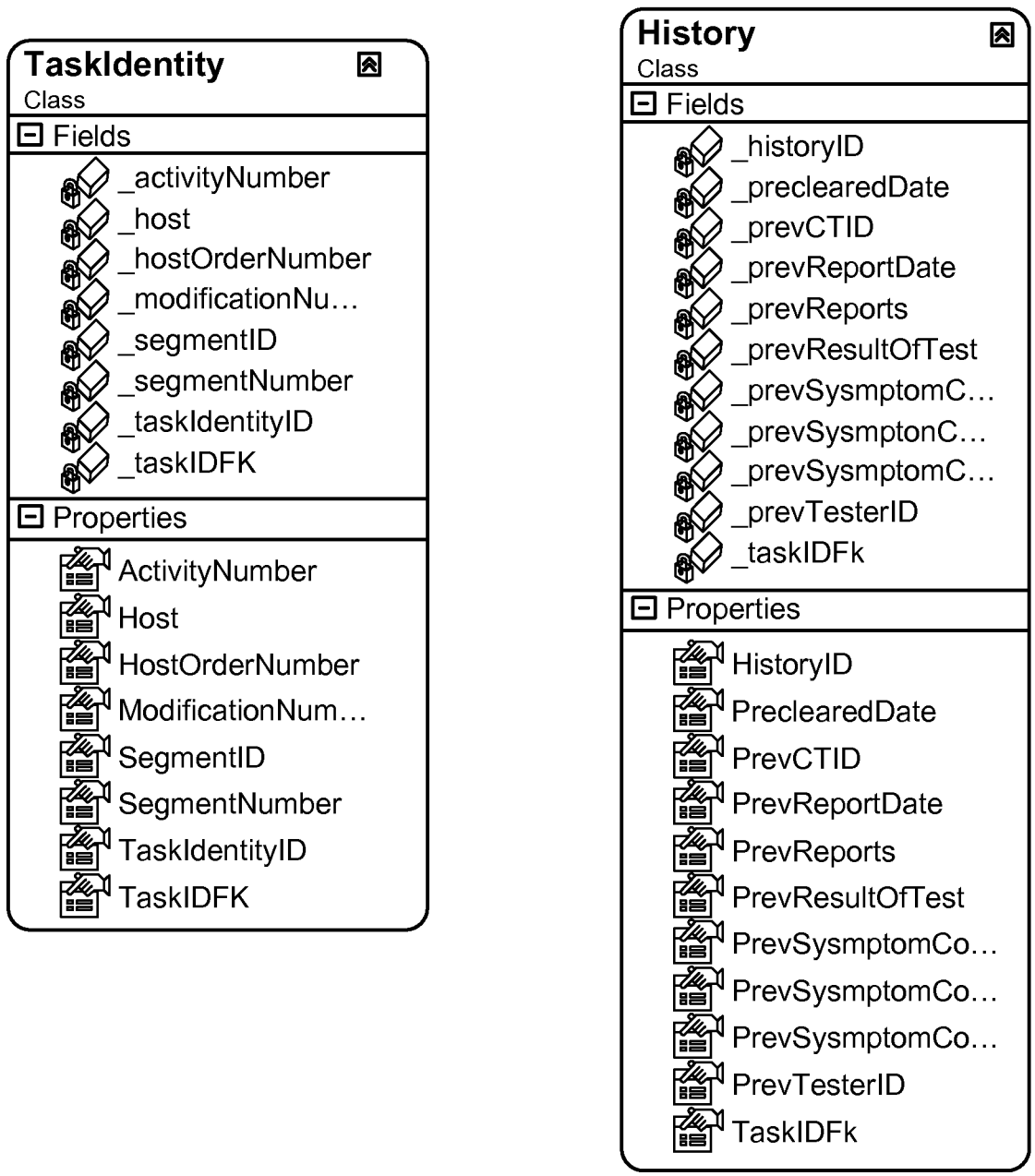
Figure 27E:
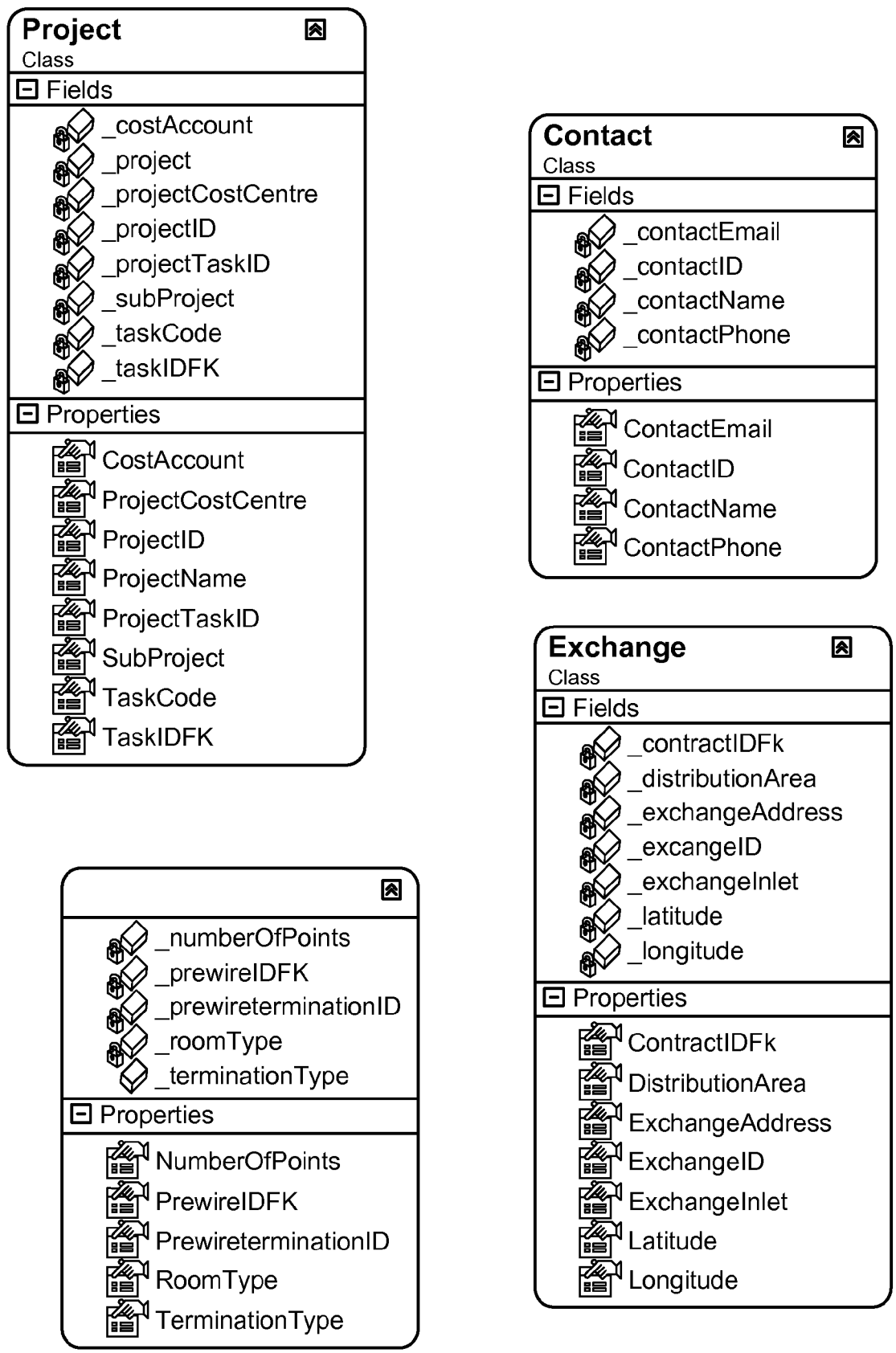
Figure 27F:
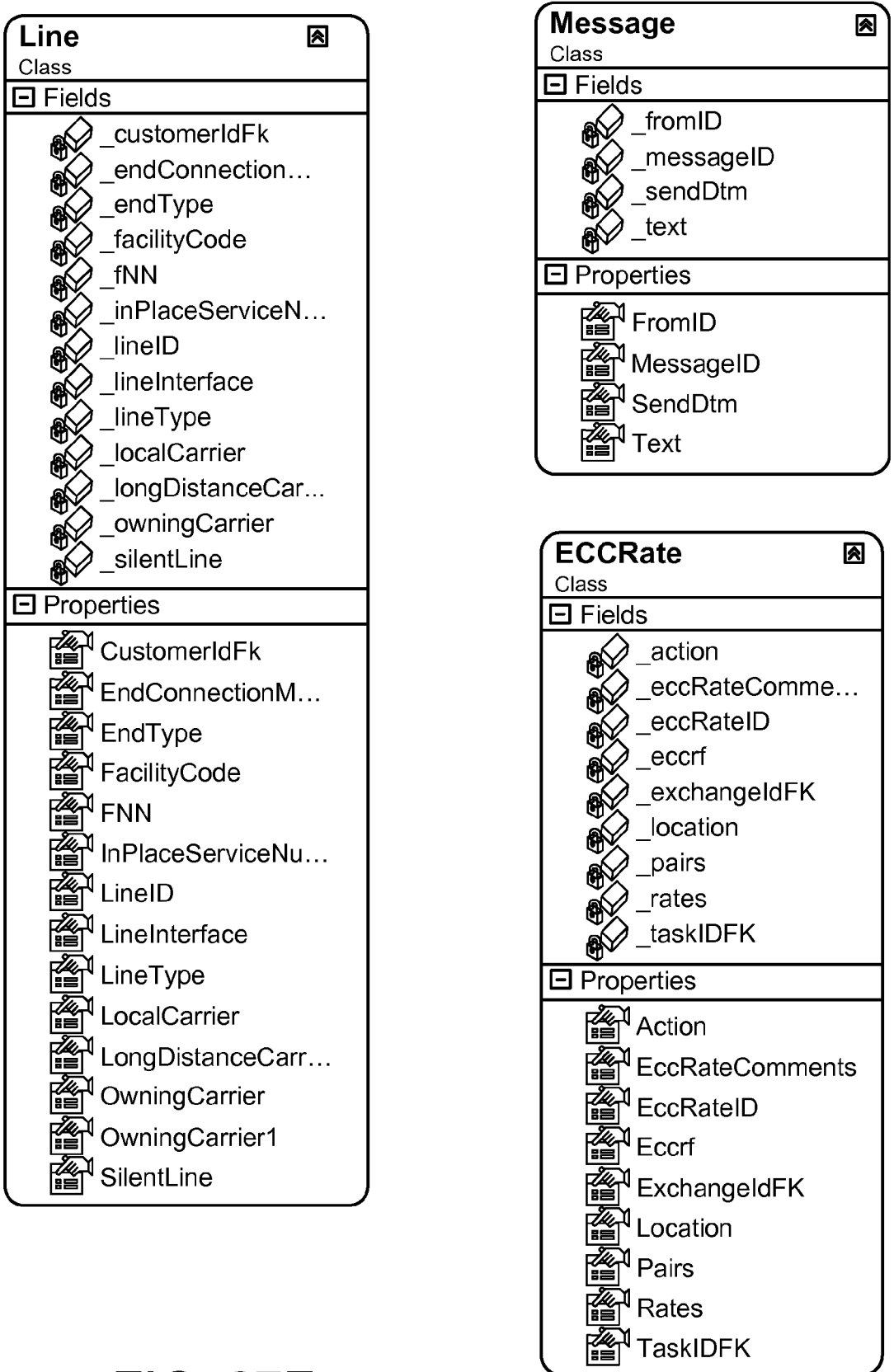
Figure 27H:
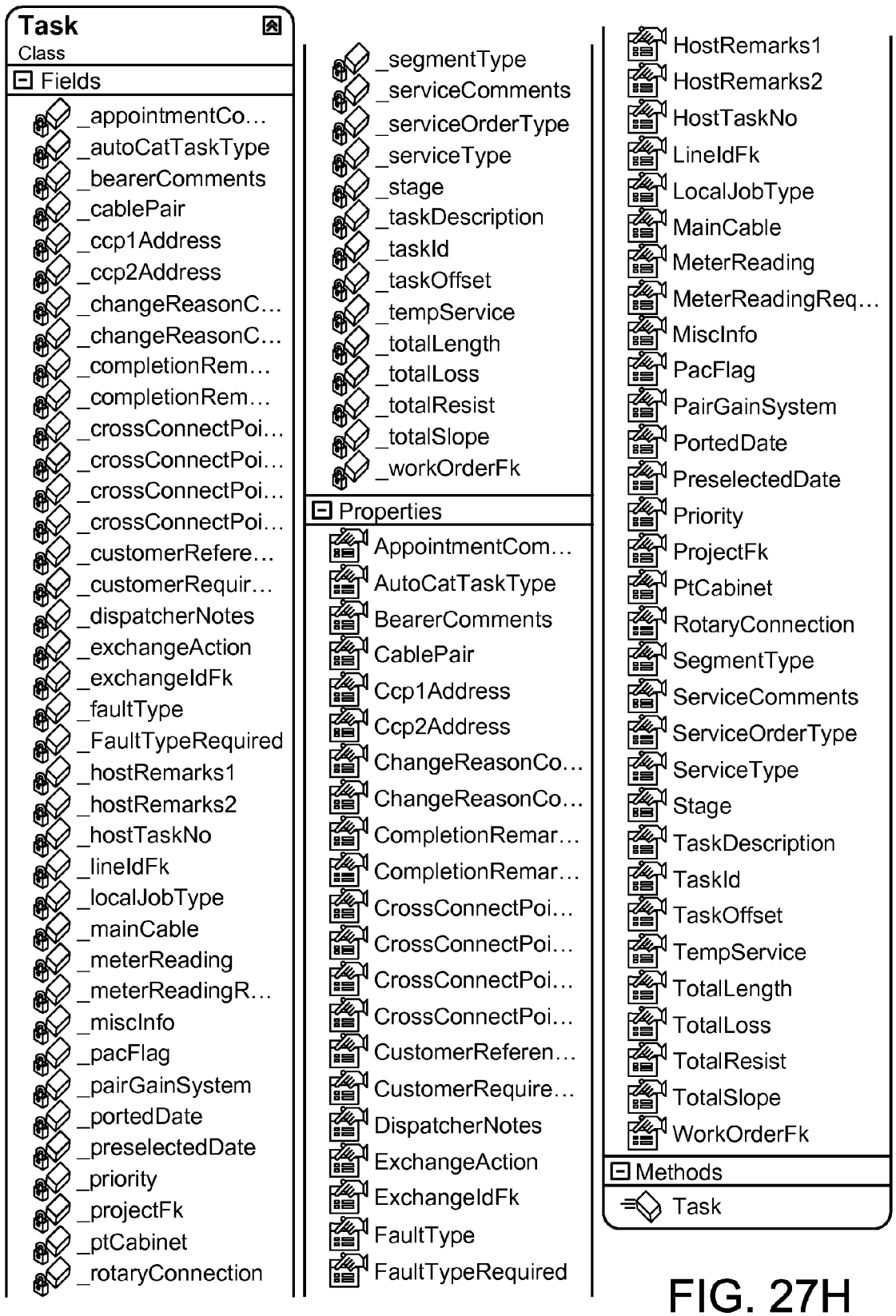

The servers 210A-N, adaptor/builder server 240, and client applications 220A-N may be one or more computing devices of various kinds, such as the computing device in FIG. 25. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web application 220A may employ the Hypertext Transfer Protocol ("HTTP") to request information, such as a web page, from a web server, which may be a process executing on the servers 210A-N.

There may be several configurations of database servers, application servers, mobile application servers, third party components, and middleware servers included in the adaptor/builder server 240 and the servers 210A-N. Database servers may include MICROSOFT SQL SERVER®, ORACLE®, IBM DB2® or any other database software, relational or otherwise. The application server may be APACHE TOMCAT®, MICROSOFT IIS®, ADOBE COLDFUSION®, YAPACHE®, DEXTERRA CONCERT SERVER®, or any other application server that supports communication protocols. Third party components may include any application that may interface with the other servers 210A-N, such as CLICKSCHEDULE®. The middleware server may be any middleware that connects software components or applications.

The application server or mobile application server on the servers 210A-N or the adaptor/builder server 240, may serve pages, such as web pages or mobile web pages to the users 120A-N. The adaptor/builder server 240 may facilitate communication between the servers 210A-N.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
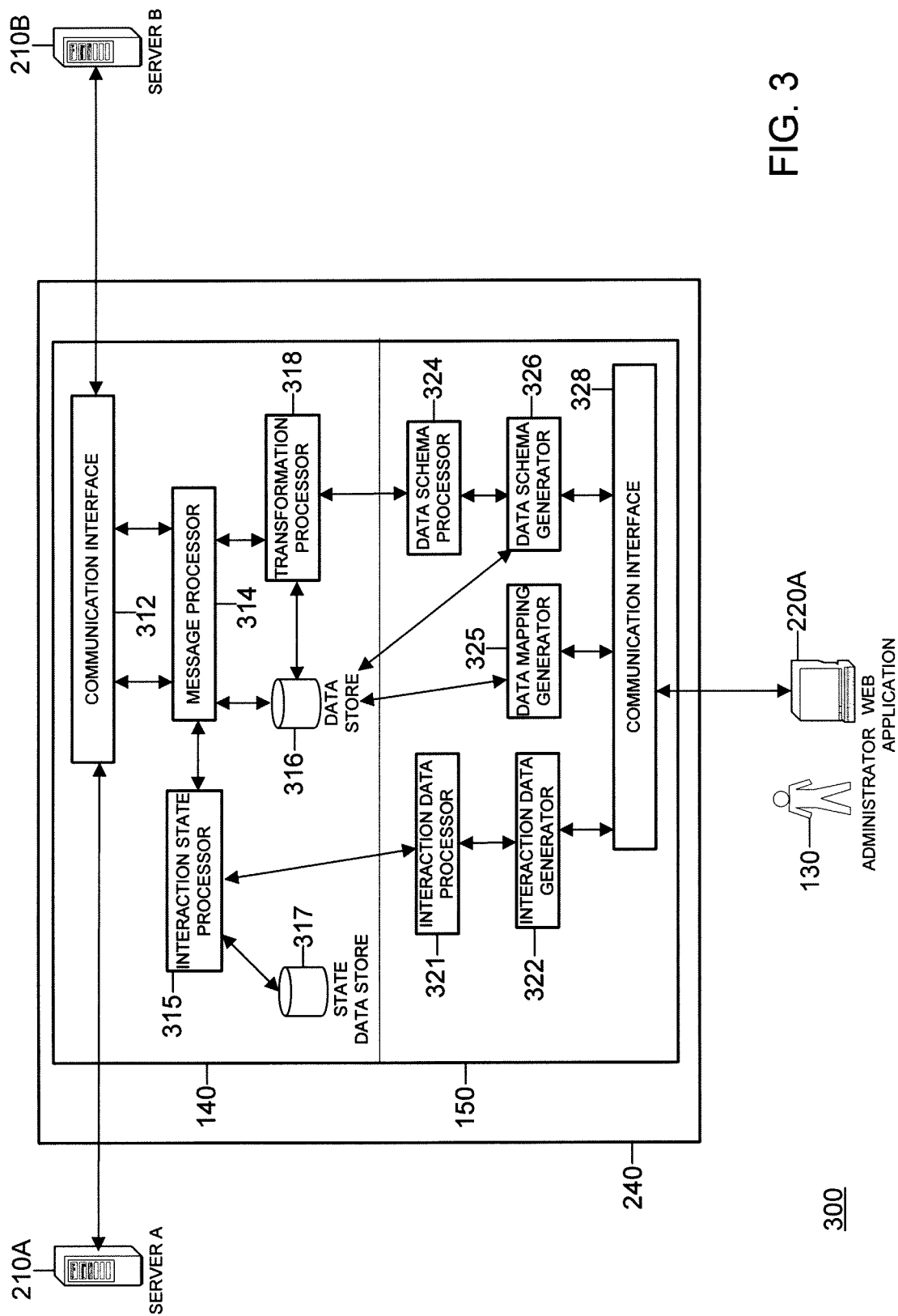
FIG. 3 is a block diagram illustrating a configurable adaptor in the systems of FIG. 1 and FIG. 2, or other systems for providing a configurable adaptor for mediating systems.

FIG. 3 illustrates a system 300 implementing a configurable adaptor built by the systems of FIG. 1 and FIG. 2, or other systems for providing a configurable adaptor for mediating systems. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 300 may include a server A 210A, a server B 210B, an adaptor/builder server 240, an adaptor 140, an adaptor builder 150, an administrator 130 and a web application A 220A. The adaptor 140 may include a communication interface 312, a message processor 314, an interaction state processor 315, a data store 316, a state date store 317, and a transformation processor 318. The adaptor builder 150 may include an interaction data generator 322, an interaction data processor 321, a data schema processor 324, a data schema generator 326, a data mapping generator 325, and a communication interface 328.

In the adaptor builder 150 the communication interface 328 may be operative to communicate with the administrator 130 via the web application 220A. The interaction data generator 322 may be operative to generate a data representation, such as programming code, or an XML file of the business logic underlying the interaction between the server A 210A and the server B 210B. The interaction data processor 321 may compile the programming code or the XML to generate the interaction state processor 315. The interaction state processor 315 may be capable of maintaining the state of the interaction identified in the programming code or the XML file. Alternatively or in addition in the case of the business logic being stored in an XML file, the interaction data generator 322 may store the XML file in the data store 316. The data schema generator 326 may be operative to generate a data representation, such as an XSLT file, of the data schemas used by the server A 210A and the server B 210B. The data schema processor 324 may be operative to process, or compile, the data representation into binary class objects. The binary class objects may then be transferred to the transformation processor 318 of the adaptor 140. The data mapping generator 325 may be used to generate an XML file of the data mapping between the data schema of the server A 210A and the server B 210B, such as in an XML file. The data mapping may be stored in the data store 316.

In the adaptor 140 the communication interface 312 may send and receive messages with the server A 210A and the server B 210B. The message processor 314 may be operative process incoming and outgoing messages. The message processor 314 may be operative to determine the interaction type received message, such as by parsing the message and/or message header. The interaction state processor 315 may be operative to determine the current state of the interaction. The interaction state processor 315 may store the data representation of an interaction and the current state of the interaction in the state data store 317. When a message is received that is not part of an existing interaction the message processor 315 may be operative to retrieve the data representation of the interaction from the data store 316 and communicate it to the interaction state processor 315. The transformation processor 318 may be operative to utilize the binary class objects generated by the data schema processor 324 and the data mapping stored in the data store 316 to transform the message from the format the server A 210A to the format of the server B 210B, or vice-versa.

The data store 316 and the state data store 317 may be operative to store data, such as data representations of business logic and data representation of a data transformation. The data store 316 and the state data store 317 may include one or more relational databases or other data stores that may be managed using various known database management techniques, such as, for example, SQL and object-based techniques. Alternatively or in addition the data store 316 and the state data store 317 may be implemented using one or more of the magnetic, optical, solid state or tape drives.

Alternatively or in addition the adaptor/builder server 240 may be in communication with additional component servers, such as the component server N 210N. In this instance, the state of the interaction may indicate the proper message transformation and the message destination. The message destination may also be included in the message itself in which case the proper transformation may be determined based on the destination.

Figure 4:
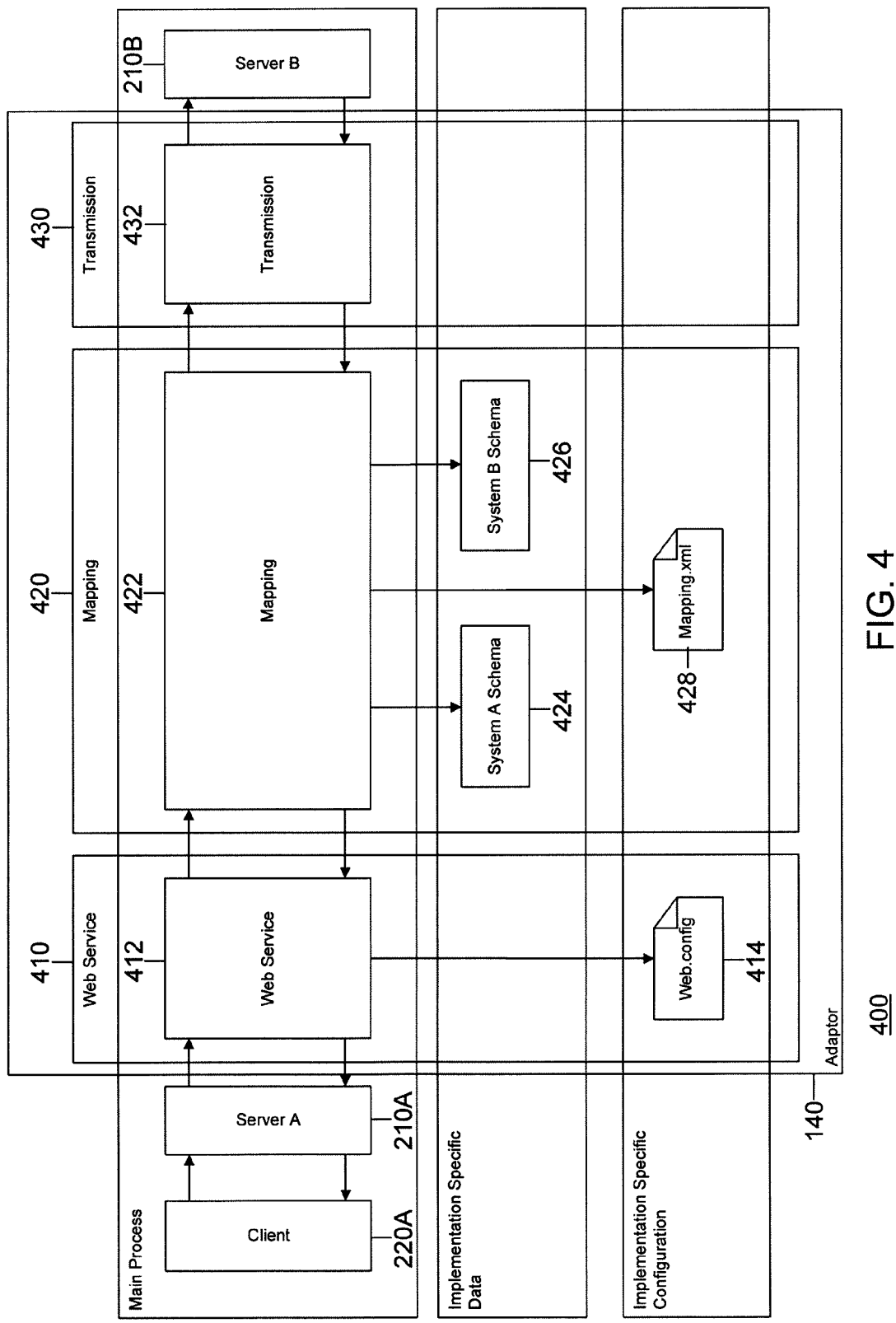
FIG. 4 is a block diagram illustrating an end to end component diagram of the systems of FIG. 1 and FIG. 2, or other systems for providing a configurable adaptor for mediating systems.

FIG. 4 illustrates an end to end component diagram 400 in the systems of FIG. 1 and FIG. 2, or other systems for providing a configurable adaptor for mediating systems. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The diagram 400 includes the client A 220A, the server A 210A, the server B 210B, and adaptor 140. The adaptor 140 may include the three functional layers of the adaptor 140, the web service layer 410, the mapping service layer 420 and the transmission service layer 430. The web service layer 410 may include the web service component 412 and the web configuration file 414. The mapping service layer 420 may include the mapping component 422, the system A schema file 424, the system B schema file 426 and the mapping data file 428. The transmission service layer 430 may include the transmission component 432.

The web service component 412 may receive and manage requests for interactions, such as upload or download interactions, from the initiating system, such as the server A 210A. The requests may be initiated by the client A 220A, communicated to the server A 210A and then communicated to the web service component 412.

The mapping component 422 may be the translations engine of the system 100. The mapping component 422 may include the transformation processor 318. The mapping component 422 may utilize the data mapping and the data schemas to manage the mapping of messages from the system A format to the system B format. The mapping component 422 may also include an interface enabling the administrator 130, or other users, to create or modify the data mapping. Alternatively or in addition the mapping component 422 may include an interface for enabling the administrator 130, or other users, to create or modify the data schemas.

The transmission component 432 may manage the delivery of the translated message to one or more end systems, such as the server B 210B.

Figure 5:
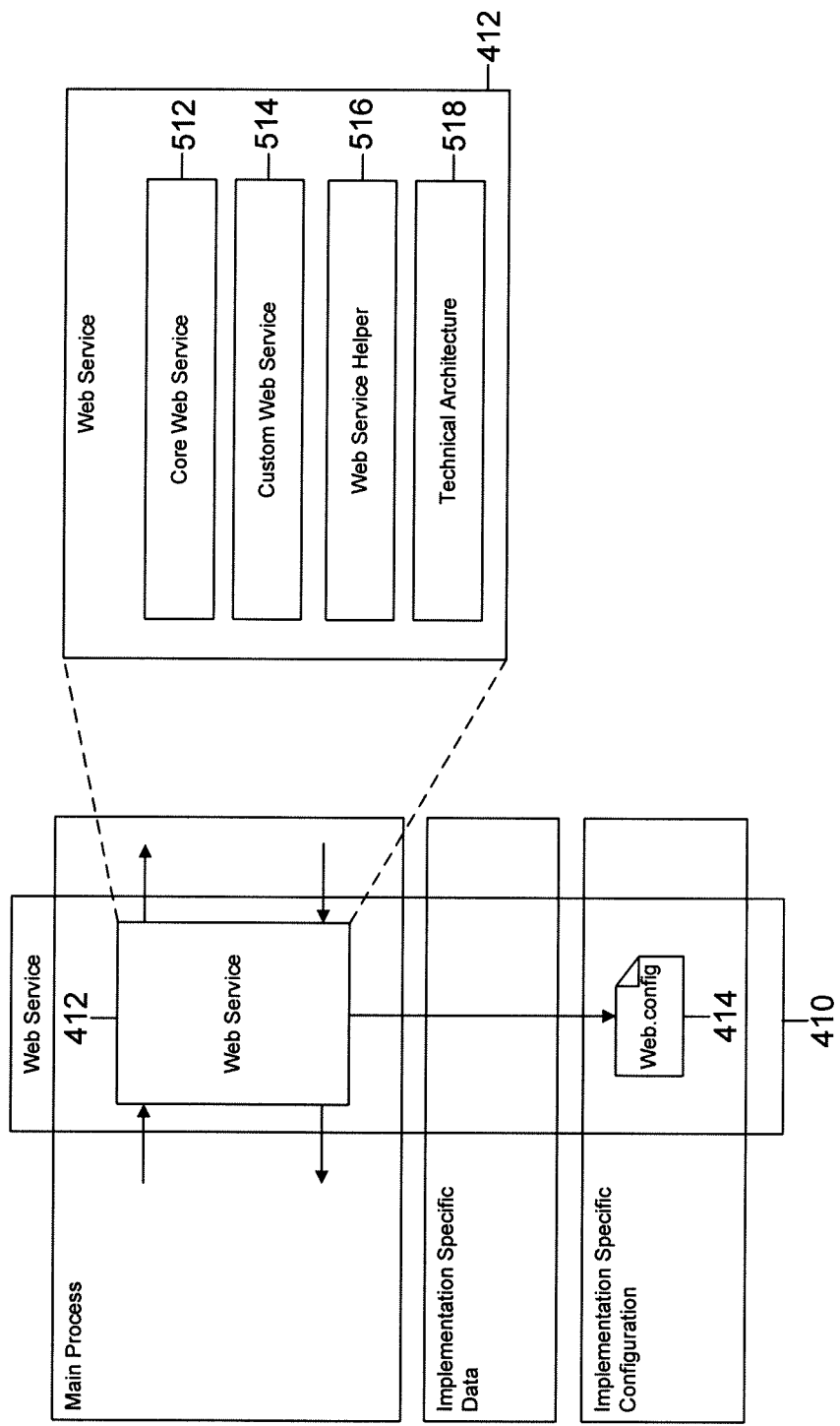
FIG. 5 is a block diagram illustrating the components of the web service layer in the end to end component diagram of FIG. 4.

FIG. 5 illustrates the components of the web service layer 410 in the end to end component diagram 400 of FIG. 4. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The web service layer 410 may include the web service component 412 and the web configuration file 414. The web service component 412 may include the core web service 512, the custom web service 514, the web service helper 516 and the technical architecture 518. The web service layer 410 may be the entry point for all of the mediated interactions, such as through the core web service 512. The custom web service 514 may provide a set of web methods that may be invoked by the server A 210A to initiate and complete interaction requests such as data upload and download requests. The functionality may be supported by a number of framework web service helper 516 functions which may mange the core functionality such as the session state. The web service helper 516 may include the interaction state processor 315. The technical architecture 518 may be the control center of the processes that are driven from the web configuration file 414.

Figure 6:
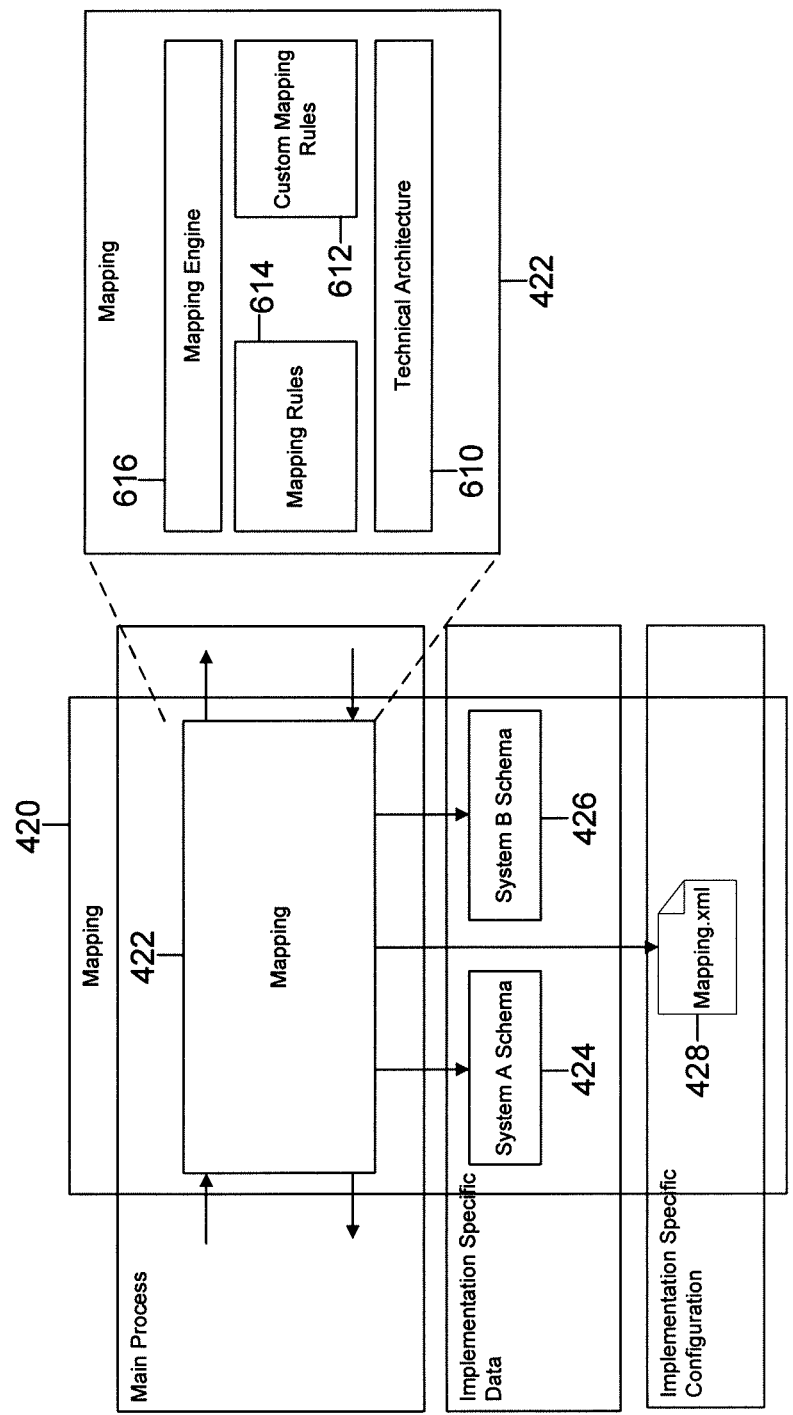
FIG. 6 is a block diagram illustrating the components of the mapping layer in the end to end component diagram of FIG. 4.

FIG. 6 illustrates the components of the mapping layer 420 in the end to end component diagram 400 of FIG. 4. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The mapping layer 420 may include a mapping component 422, the system A schema file 424, the system B schema file 426 and the mapping data file 428. The mapping component 422 may include a mapping engine 616, a mapping rules 614, a custom mapping rules 612 and a technical architecture 610.

The mapping component 422 may be a core mapping engine that performs the data mapping transformation, such as object to object mapping. The data mapping transformation may be driven by the configuration files generated by the administrator 130. In one instance the mapping may consists of an object to object mapping of request and response messages to and from a front end client and a back end system. The mapping engine 616 may include the transformation processor 318. In one instance a number of core mapping rules may be provided in the mapping rules 614 as part of the framework of the system. The core mapping rules may enable an administrator to quickly identify common data mappings such as date and time mappings. The mapping component 422 may also include an interface to enable an administrator 130 to modify the data mapping. Alternatively or in addition the mapping component 422 may include an interface enabling an administrator 130 to modify the data schemas of the systems 110A-N.

Figure 7:
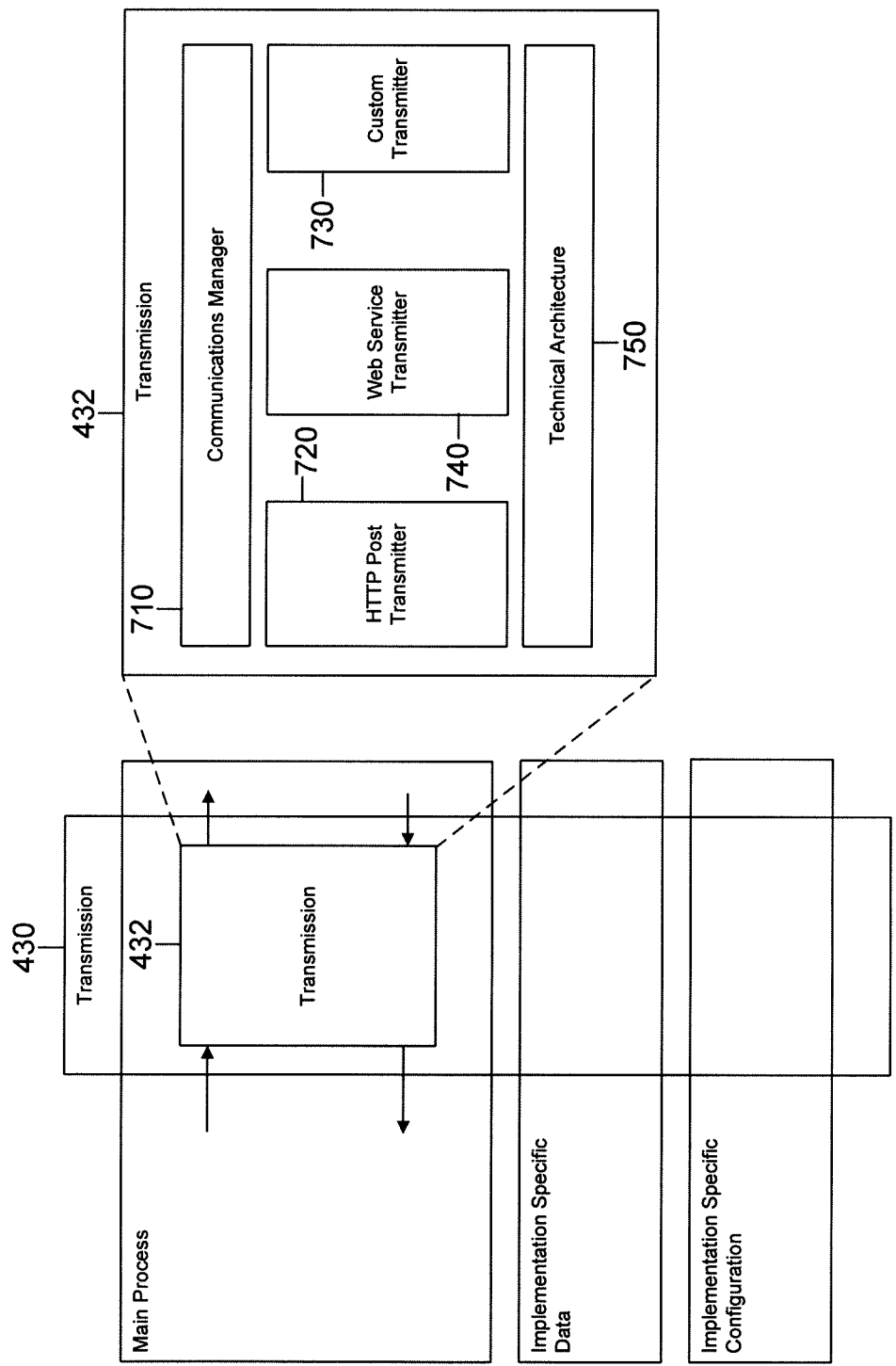
FIG. 7 is a block diagram illustrating the components of the transmission layer in the end to end component diagram of FIG. 4.

FIG. 7 illustrates the components of the transmission layer 430 in the end to end component diagram 400 of FIG. 4. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The transmission layer 430 may include the transmission component 432. The transmission component 432 may include the communications manager 710, the HTTP post transmitter 720, the web service transmitter 740, the custom transmitter 730, and the technical architecture 750.

The transmission component 432 may provide a core communication management layer to allow the adaptor 140 to communicate with a variety of end systems 110A-N. The transmission component 432 may be configured to function with any communication protocols. In one instance the transmission component 432 may include two core transmitters, the standard HTTP post transmitter 720, and the web service transmitter 740. The HTTP post transmitter 720 may serialize a mapped object to an XML formatted Service Oriented Architecture Protocol ("SOAP") wrapped message and deliver it to a web page of an end system. The web service transmitter 740 may deliver a mapped object directly to an end system web service. The communications manager 710 may provide an interface that may allow the administrator 130, or other users, to develop custom transmitters for implementations utilizing a specific communication protocol, such as a file transport protocol ("FTP") transmitter or a MICROSOFT® message queuing transmitter.

The technical architectures 518, 610, 750 may underpin each of the components. The technical architectures 518, 610, 750 may provide key and common functionality such as error handling, event logging and configuration management. In one instance the implementations may be based on MICROSOFT ENTERPRISE LIBRARY 2.0® functions.

Figure 8:
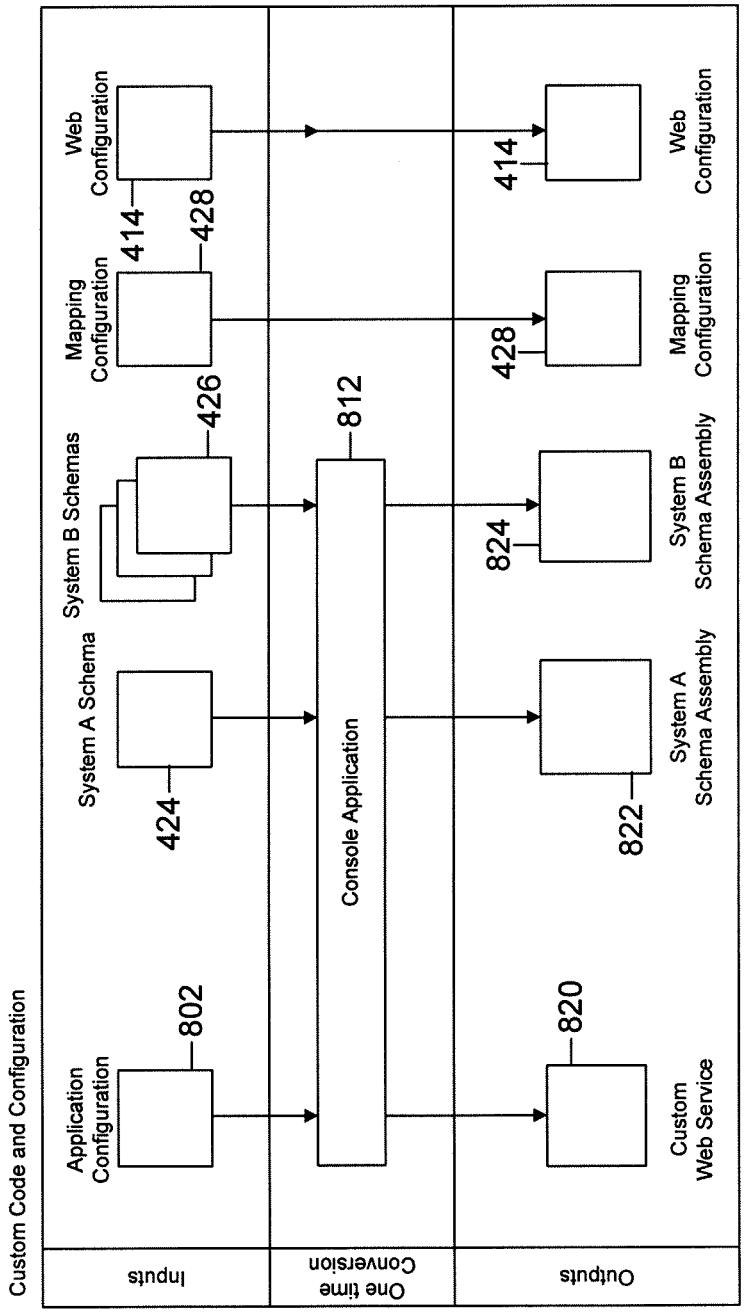
FIG. 8 is a block diagram illustrating the custom code components of the end to end component diagram of FIG. 4.

FIG. 8 illustrates the custom code components and configuration of the systems of FIG. 1 and FIG. 2, or other systems for providing a configurable adaptor for mediating systems. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The custom configuration components may include the application configuration 820, the system A schema 424, the system B schema 426, the mapping configuration 428, the web configuration 412, the console application 812, the custom web service 820 the system A schema assembly 822, and the system B schema assembly 824.

The console application 812 may include the data schema processor 423 and/or the interaction data processor 312. The console application 812 may provide a once at build time conversion of information in XML and/or XSLT files into raw code, compiled code, and configuration files utilized by the adaptor 140. In addition to the custom configuration and code components, such as the custom mapping rules and the custom transmitters, the administrator 130 may utilize plug-in components to provide further custom functionality to the adaptor 140. In one instance the plug-in components may be written implementing generic adaptor application programming interfaces ("APIs") using the MICROSOFT VISUAL STUDIO 2005® toolset.

Figure 9:
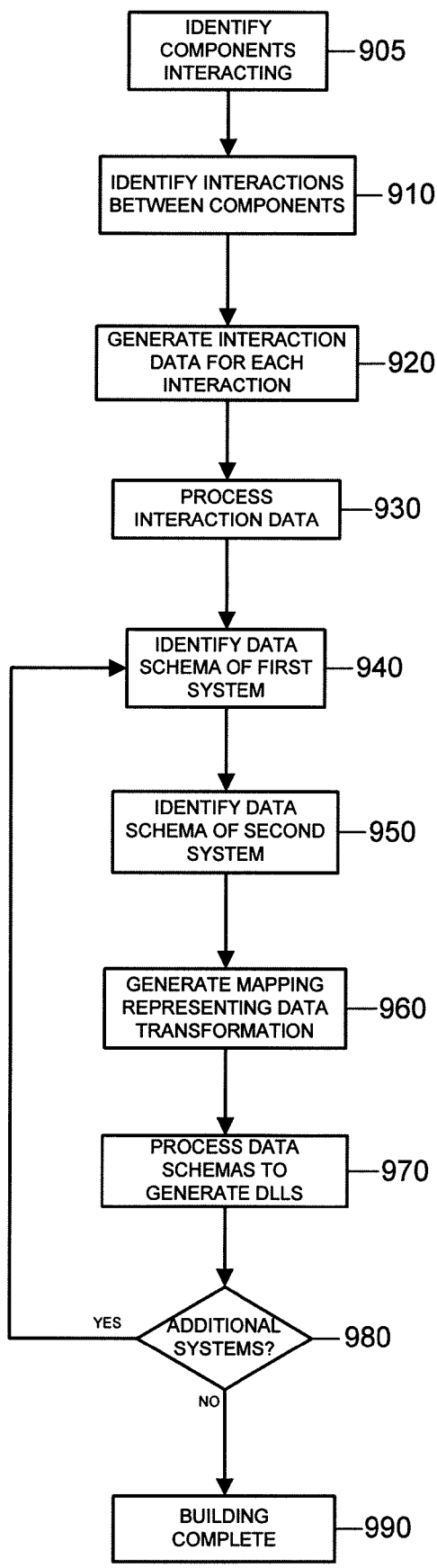
FIG. 9 is a flowchart illustrating the operations of the systems of FIG. 1, FIG. 2, and FIG. 3, or other systems for providing a configurable adaptor for mediating systems.

FIG. 9 is a flowchart illustrating the operations of the systems of FIG. 1, FIG. 2, and FIG. 3, or other systems for providing a configurable adaptor for mediating systems. At block 905 the administrator 130 may identify one or more systems 110A-N which can not properly communicate. At block 910 the administrator 130 may identify the interactions between the systems 110A-N, such as an upload request and a download request, and the underlying business logic for each of the interactions. One such interaction may be downloading a work ticket. The business logic for downloading a work ticket may be a request for the work ticket from the system A 110A and then a response from one or more other components 110B-N with the data necessary to display the work ticket. The administrator 130 may utilize an interface, such as a web interface, provided by the adaptor builder 150 to identify the interactions and the underlying business logic. Alternatively or in addition the administrator 130 may use the MICROSOFT VISUAL STUDIO 2005® toolset to generate programming code describing the interactions, such as the upload and download processes.

At block 920 the interaction data generator 322 may generate interaction data, such as an XML file or programming code, describing the business logic, or steps, of each interaction. At block 930 the interaction data processor 321 may process the interaction data and communicate the interaction data to the interaction state processor 315. In the case of programming code the interaction data processor 321 may compile the code into a binary file. At block 940 the administrator 130 may identify the data schema of the first system A 110A identified in the interaction data. At block 950 the administrator 130 may identify the data schema of the second system B 110B identified in the interaction data. The administrator 130 may use an interface, such as a web interface, provided by the adaptor builder 150 to identify the data schemas and the data provided to the interface may be processed into a data file, such as an XSLT file, by the data schema generator 326. Alternatively or in addition the administrator may use an XML tool, such as ALTOVA XML SPY®, to identify and generate the data schemas. The data schemas may be stored in XSLT files or in any other data file.

At block 960 the administrator 130 may use the interface to generate a data mapping of the data formats of components 110A-B. The data mapping may represent the data transformation necessary to facilitate communication between the systems 110A-B. The data mapping may be represented in an XML file or other data file. At block 970 the data schema processor 324 may process the data schemas to generate the binary DLLs used to process the data transformation. The mapping generator 326 may store the mapping data file and the system data schema files in the data store 316 so the data files may be retrieved for modification. The binary DLLs may be communicated to the transformation processor 318 of the adaptor 140.

At block 980 the adaptor builder 150 may determine whether the stored interactions require any additional data transformations. If the adaptor builder 150 determines that additional data transformations are necessary the system 100 may move to block 940. If there are no further data transformations necessary the system 100 may move to block 990. At block 990 the building of the adaptor 140 may be complete.

Figure 10:
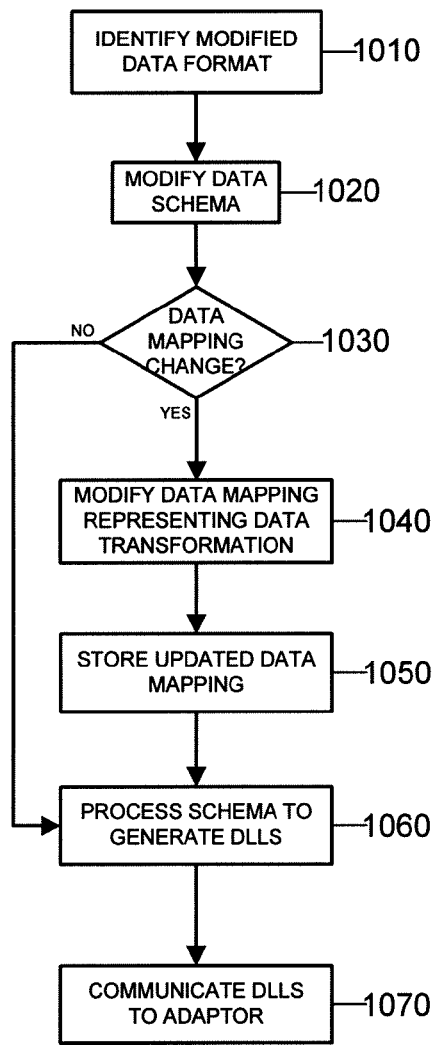
FIG. 10 is a flowchart illustrating the operations of re-configuring a configurable adaptor for a data schema change in the systems of FIG. 1, FIG. 2, and FIG. 3, or other systems for providing a configurable adaptor for mediating systems.

FIG. 10 is a flowchart illustrating the operations of re-configuring a configurable adaptor for a data schema change in the systems of FIG. 1, FIG. 2, and FIG. 3, or other systems for providing a configurable adaptor for mediating systems. At block 1010 the administrator 130 may identify a modified data format in one of the systems 110A-N. At block 1020 the administrator 130 may utilize the interface provided by the adaptor builder 150 to update the data schemas of the systems 110A-N, such as by modifying the XSLT files representing the underlying data schemas. Alternatively or in addition the administrator 130 may use the interface to add additional data transformations. At block 1030 the administrator 130 may indicate whether the data mapping changed. If the data mapping has also changed, the system moves to block 1040. At block 1040 the administrator 130 may use the interface to modify the data mapping. The data mapping generator 325 may update the underlying data file representing the data mapping, such as an XML file. At block 1050 the data mapping generator 325 may communicate the updated XML file to the adaptor 140 to store in the data store 316. At block 1060 the data schema processor 324 may process the modified data schema files, such as XSLT files, to generate the updated DLLs representing the data schemas. At block 1070 the updated DLLs may be communicated to the transformation processor 318 of the adaptor 1040. If at block 1030 the administrator 130 indicates there is not a data mapping change, the system 100 may move to block 1060.

Figure 11:
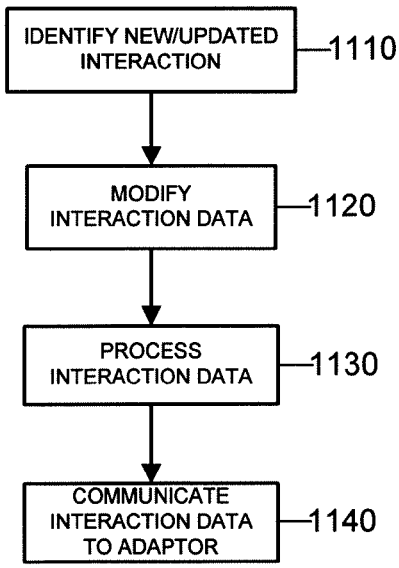
FIG. 11 is a flowchart illustrating the operations of re-configuring a configurable adaptor for an interaction change in the systems of FIG. 1, FIG. 2, and FIG. 3, or other systems for providing a configurable adaptor for mediating systems.

FIG. 11 is a flowchart illustrating the operations of re-configuring a configurable adaptor for an interaction change in the systems of FIG. 1, FIG. 2, and FIG. 3, or other systems for providing a configurable adaptor for mediating systems. At block 1110 the administrator 130 may identify a new or updated interaction between the systems 110A-N. At block 1120 the administrator 130 may utilize the interface provided by the adaptor builder 150 to modify the business logic of the interaction. The adaptor builder 150 may load the existing interaction data into the interface from the data store 316. Once the administrator 130 has modified the business logic through the interface the interaction data generator 322 may generate a data representation of the business logic, such as an XML file, programming code, and/or programming code stubs. At block 1130 the interaction data generator 322 may process the interaction data, such as by compiling the programming code. At block 1140 the adaptor builder 150 may communicate the updated interaction data to the interaction state processor 315 of the adaptor 140 for a seamless business logic update.

Figure 12:
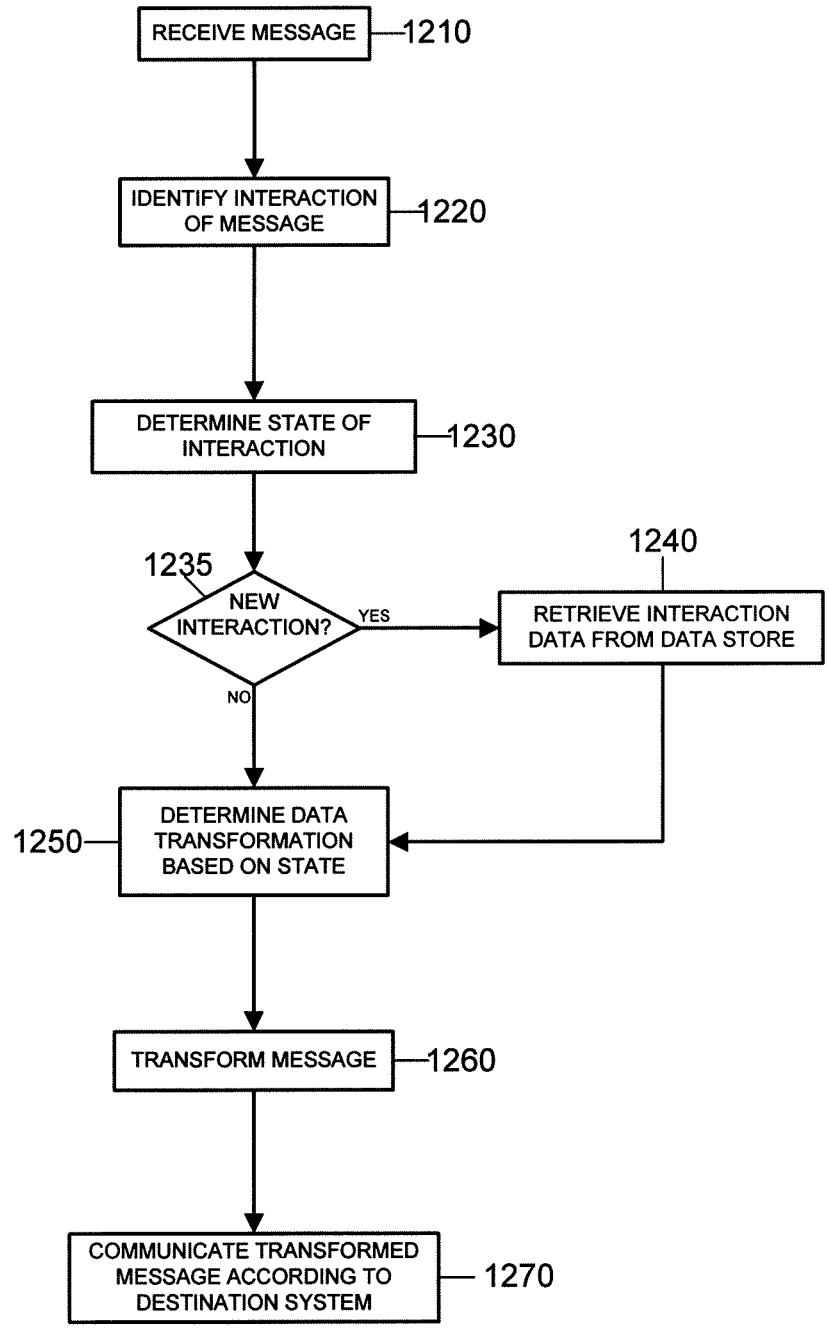
FIG. 12 is a flowchart illustrating the operations of a configurable adaptor built by the systems of FIG. 1, FIG. 2, and FIG. 3, or other systems for providing a configurable adaptor for mediating systems.

FIG. 12 is a flowchart illustrating the operations of a configurable adaptor built by the systems of FIG. 1, FIG. 2, and FIG. 3, or other systems for providing a configurable adaptor for mediating systems. At block 1210 the adaptor 140 may receive a message from a component, such as the system A 110A, via the communication interface 312. For example, the message may be a work ticket request. The communication interface 312 may communicate the message to the message processor 314. At block 1220, the message processor 314 may identify the interaction the message pertains to, such as an upload process or a download process. In the example of a work ticket request, the interaction may be a download process, such as a work ticket request interaction. The message processor 314 may identify the interaction the message relates to by parsing the message and/or the message header.

At block 1230 the interaction state processor 315 may determine the state of the interaction. The interaction state processor 315 may determine whether any existing state data exists in the state date store 317. At block 1235, if no state data exists in the state date store, then the interaction may be a new interaction and the system 100 may move to block 1240. At block 1240 the system 100 may retrieve the interaction data associated with the interaction from the data store 316. At block 1250 the message processor 314 may determine the proper data transformation based on the state of the interaction and the interaction data. For example, each element in the interaction data associated with a data transformation may indicate the system, or the data format, associated with the destination system, such as the system B 110B. Alternatively or in addition the message processor 314 may be able to determine the destination component by parsing the message and/or the message header, such by parsing the destination internet protocol ("IP") address. The data store 316 may include a mapping of an IP address and/or a system name, and a descriptor of the appropriate binary class objects stored in the DLLs. Thus, the message processor 314 may be able to retrieve the appropriate binary class objects from the data store 316 based on the destination IP and/or the component name.

At block 1260 the message processor 314 may communicate the message and descriptors of the appropriate binary class objects to the transformation processor 318. The transformation processor 318 may utilize the data mapping file, such as an XML file, stored in the data store 316 to identify the appropriate binary class objects to transform the message.

The transformed message may be communicated back to the message processor 314. At block 1270 the message processor 314 may communicate the message to the communication interface 312, which may communicate the message to the destination component, such as the system B 110B.

Figure 13:
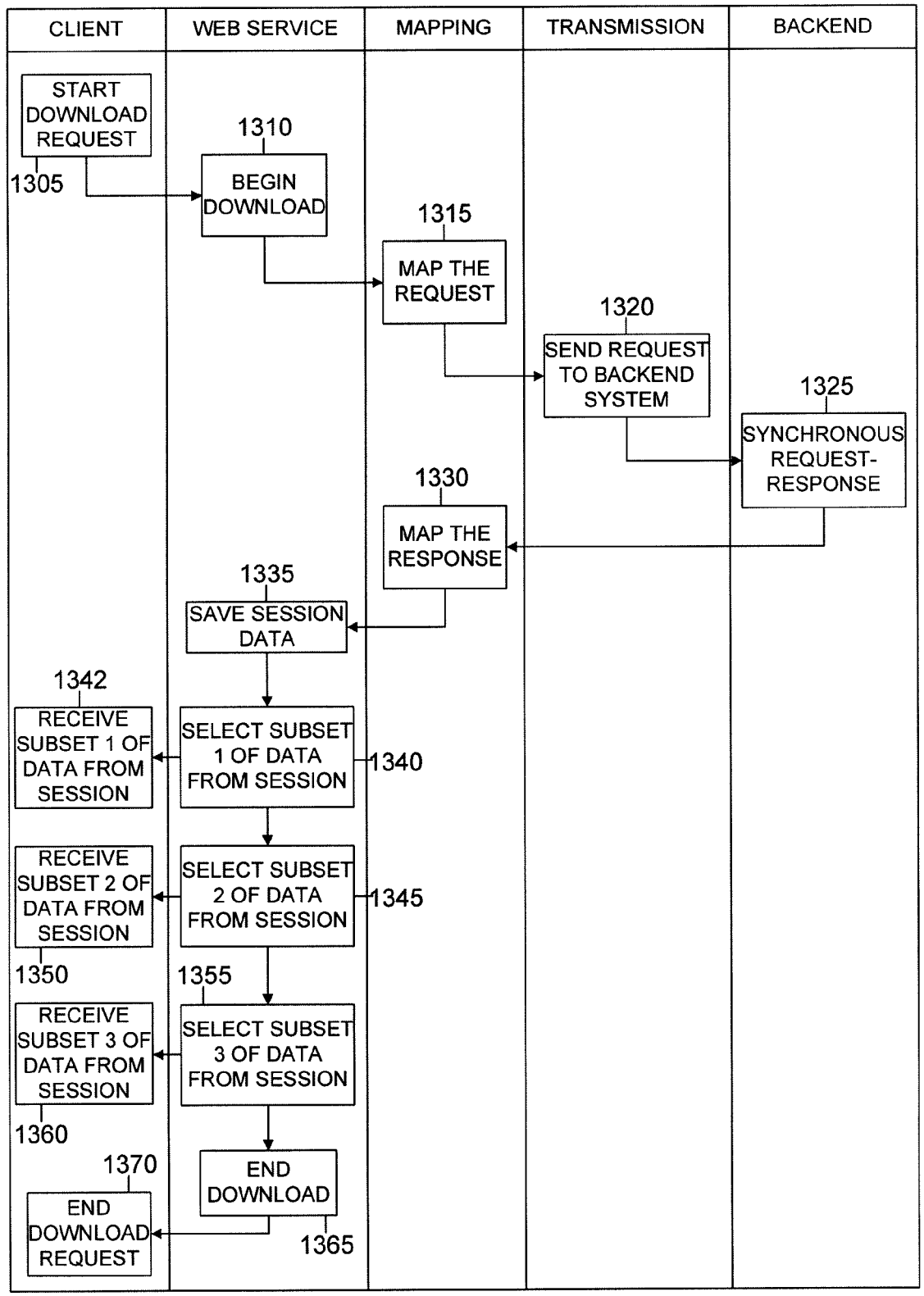
FIG. 13 is a flowchart illustrating the operations of a download request interaction in the systems of FIG. 1, FIG. 2, and FIG. 3, or other systems for providing a configurable adaptor for mediating systems.

FIG. 13 is a flowchart illustrating the operations of a download request interaction from the system A 110A to the system B 110B in the systems of FIG. 1, FIG. 2, and FIG. 3, or other systems for providing a configurable adaptor for mediating systems. At block 1305 the client A 220A may send a download request to the server A 210A. At block 1310 the server A 210A may begin the download with the adapter server 240. At block 1315 the adaptor server 240 may map the request to the format of the server B 110B. At block 1320 the adaptor 140 may communicate the request to the server B 110B. At block 1325 the server B 110B may generate a response for the request, such as a synchronous request-response. The response may then be communicated to the adaptor 140.

At block 1330 the adaptor 140 may map the response to the data format of the server A 110A. At block 1335 the response may be communicated to the server A 210A and saved as session data to be communicated to the client A 220A. The server A 210A may then communicate the response in smaller subsets to the client A 220A. At block 1340 the server A 210A may select a first subset of the data. At block 1342 the client A 220A may receive the first subset of the data from the server A 210A. At block 1345 the server A 210A may select the second subset of the data. At block 1350 the client A 220A may receive the second subset of the data from the server A 210A. At block 1355 the server A 210A may select the third subset of the data. At block 1360 the client A 220A may receive the third subset of the data from the server A 210A. At block 1365 the server A 210A may signal the end of the download. At block 1370 the client A 220A may receive the end download request.

Figure 14:
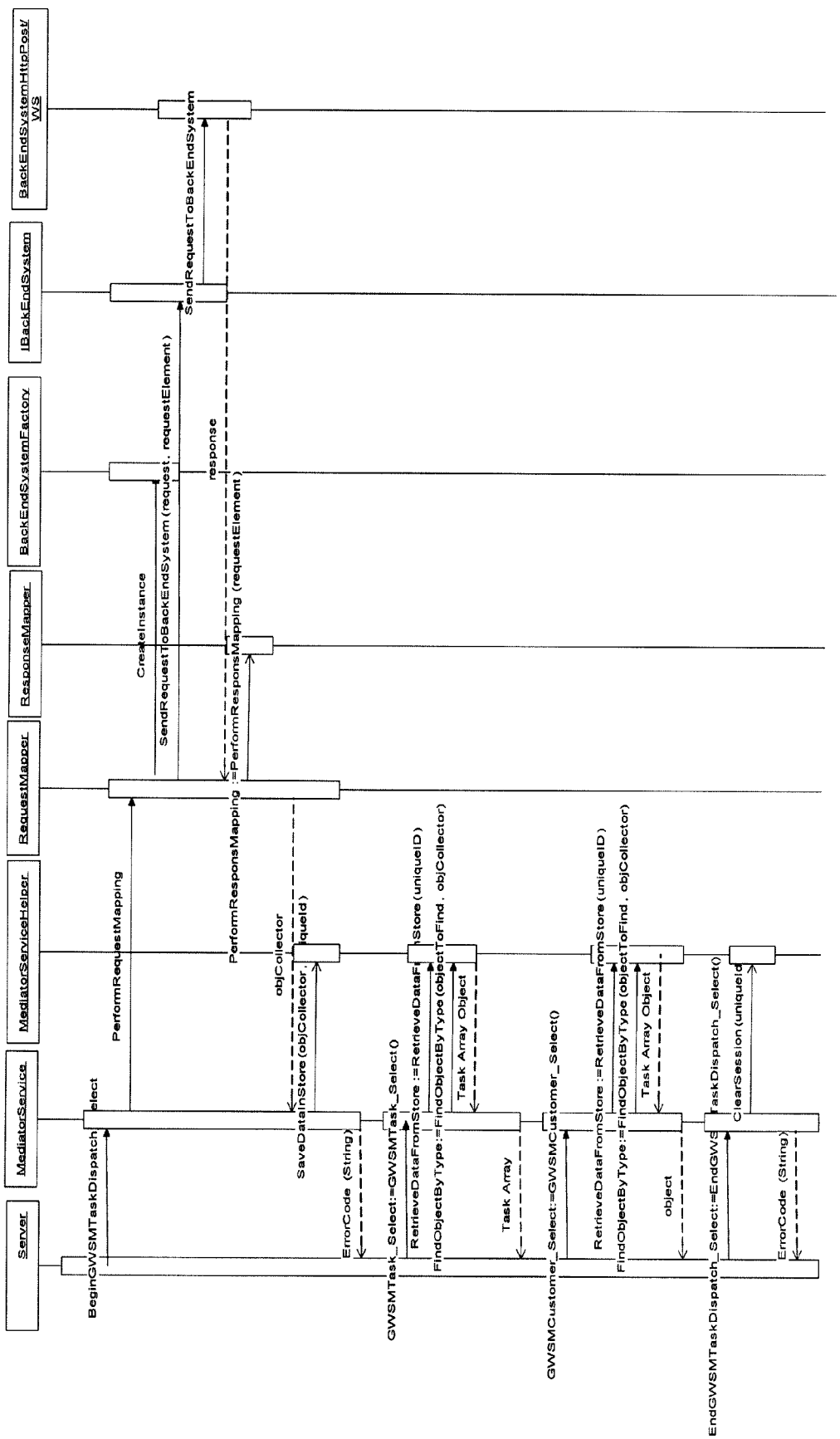
FIG. 14 is a process flowchart illustrating the operations of a download request interaction in the systems of FIG. 1, FIG. 2, and FIG. 3, or other systems for providing a configurable adaptor for mediating systems.

FIG. 14 is a process flowchart illustrating the operations of a download request process in the systems of FIG. 1, FIG. 2, and FIG. 3, or other systems for providing a configurable adaptor for mediating systems. In FIG. 14 the server may refer to the server A 210A and the backend system may refer to the server B 210B.

Figure 15:
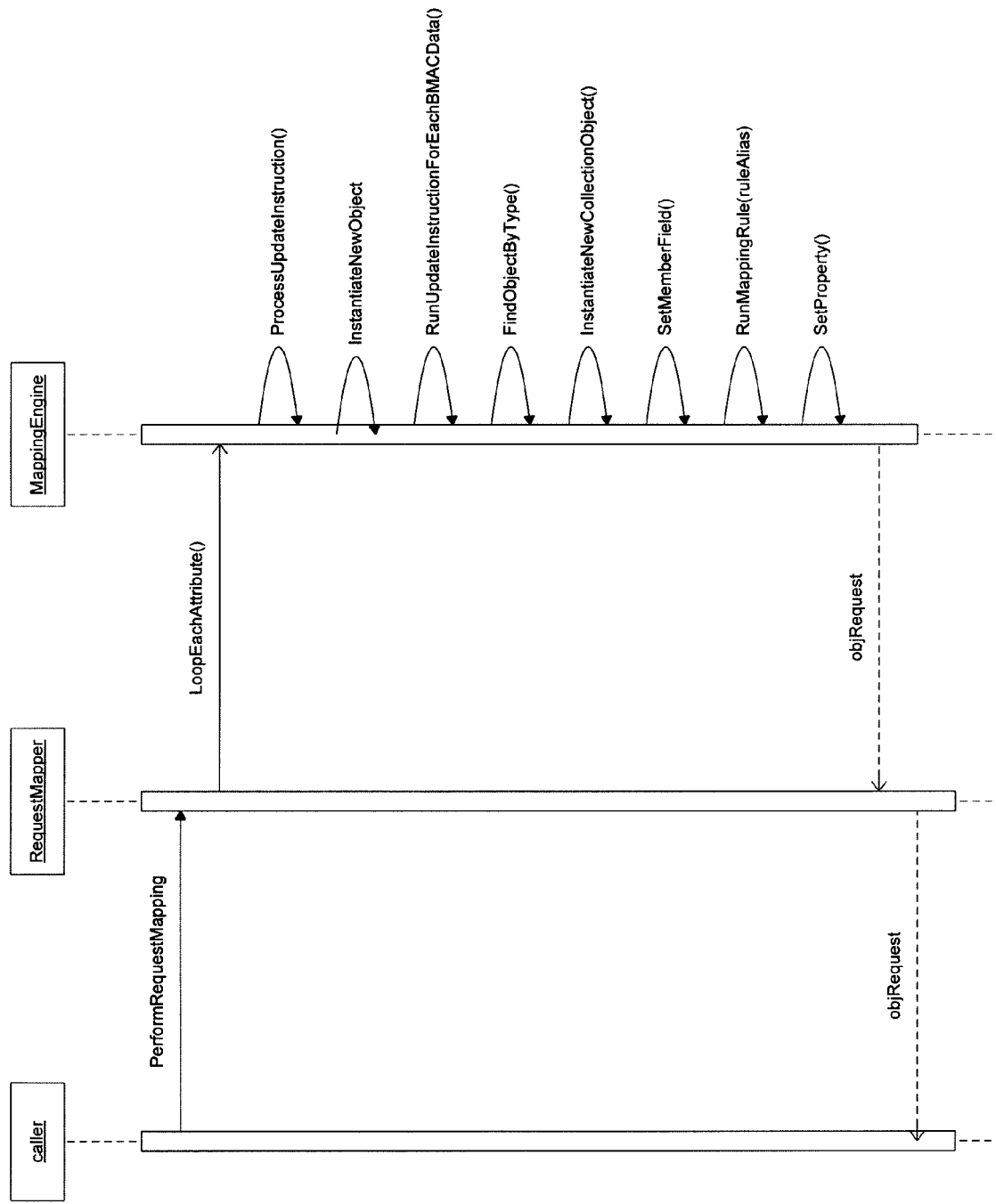
FIG. 15 is a process flowchart illustrating exemplary methods used in the operation of a download request interaction in the systems of FIG. 1, FIG. 2, and FIG. 3, or other systems for providing a configurable adaptor for mediating systems.

FIG. 15 is a process flowchart illustrating exemplary methods used in the operation of a download request process in the systems of FIG. 1, FIG. 2, and FIG. 3, or other systems for providing a configurable adaptor for mediating systems. FIG. 15 may demonstrate the methods that may be called by the adaptor 140 when performing a data mapping of a request from the server A 210A to the server B 210B.

Figure 16:
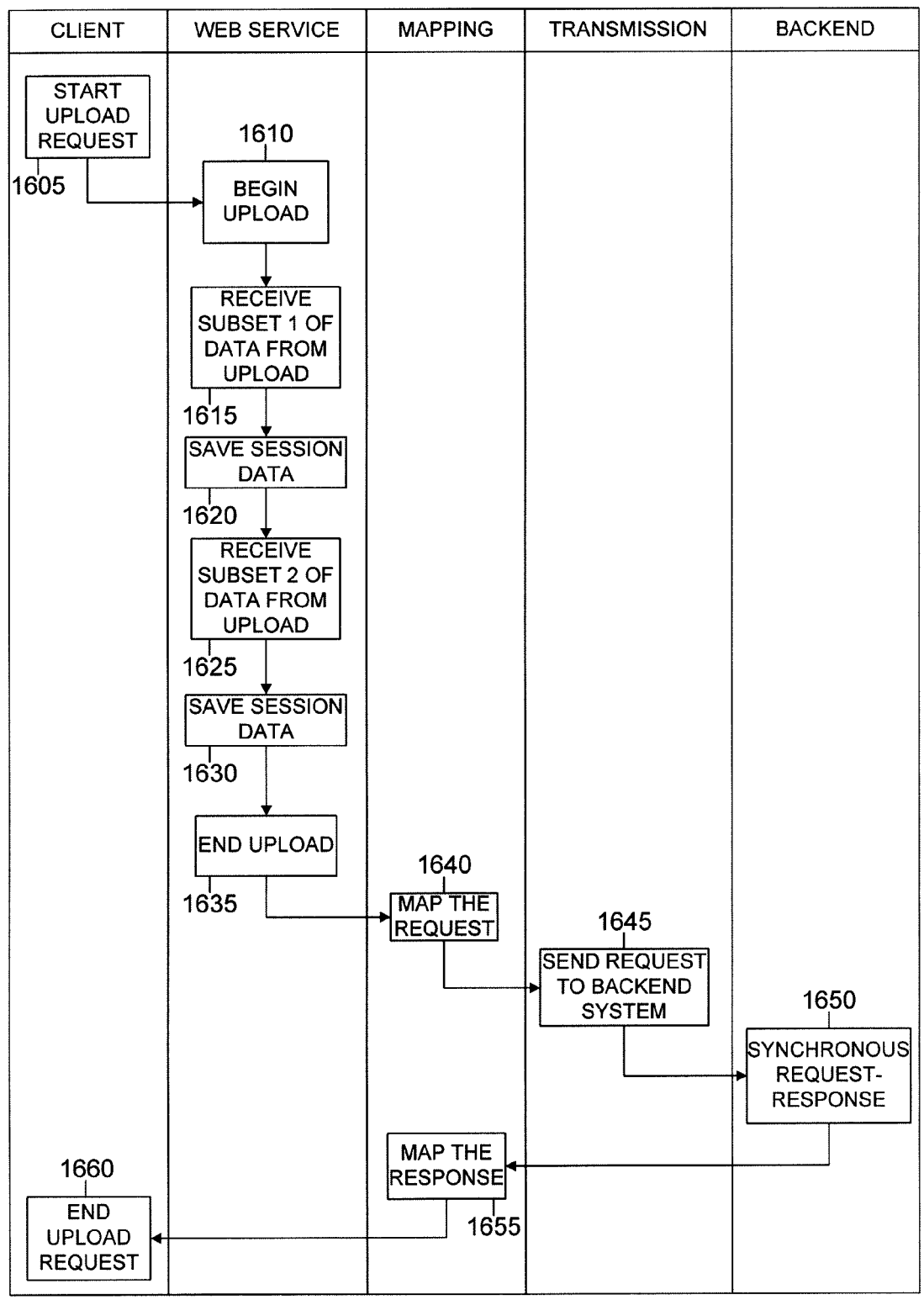
FIG. 16 is a flowchart illustrating the operations of an upload request interaction in the systems of FIG. 1, FIG. 2, and FIG. 3, or other systems for providing a configurable adaptor for mediating systems.

FIG. 16 is a flowchart illustrating the operations of an upload request process in the systems of FIG. 1, FIG. 2, and FIG. 3, or other systems for providing a configurable adaptor for mediating systems. At block 1605 the client A 220A may start an upload request with the server A 210A. At block 1610 the server A 210A may begin the upload. At block 1615 the server A 210A may receive the first subset of data from the client A 220A. At block 1620 the server A 210A may save the first subset of data in the session data. At block 1625 the server A 210A may receive the second subset of data from the client A 220A. At block 1630 the server A 210A may save the second subset of data in the session data. At block 1635 the client A 220A may end the upload to the server A 210A. At block 1640 the server A 210A may communicate the request to the adaptor 140. The adaptor 140 may map the request to the data format of the server B 210B. At block 1645 the adaptor 140 may communicate the mapped response to the backend system, such as the server B 210B. At block 1650 the server B 210B may generate a response to the request, such as a synchronous response to the request. The server B 210B may then communicate the response to the adaptor 140. At block 1655 the adaptor may map the response to the data format of the system A 110A. At block 1660 the adaptor 140 may communicate the end of the request to the server A 210A. The server A 210A may then communicate the end of the request to the client A 220A.

Figure 17:
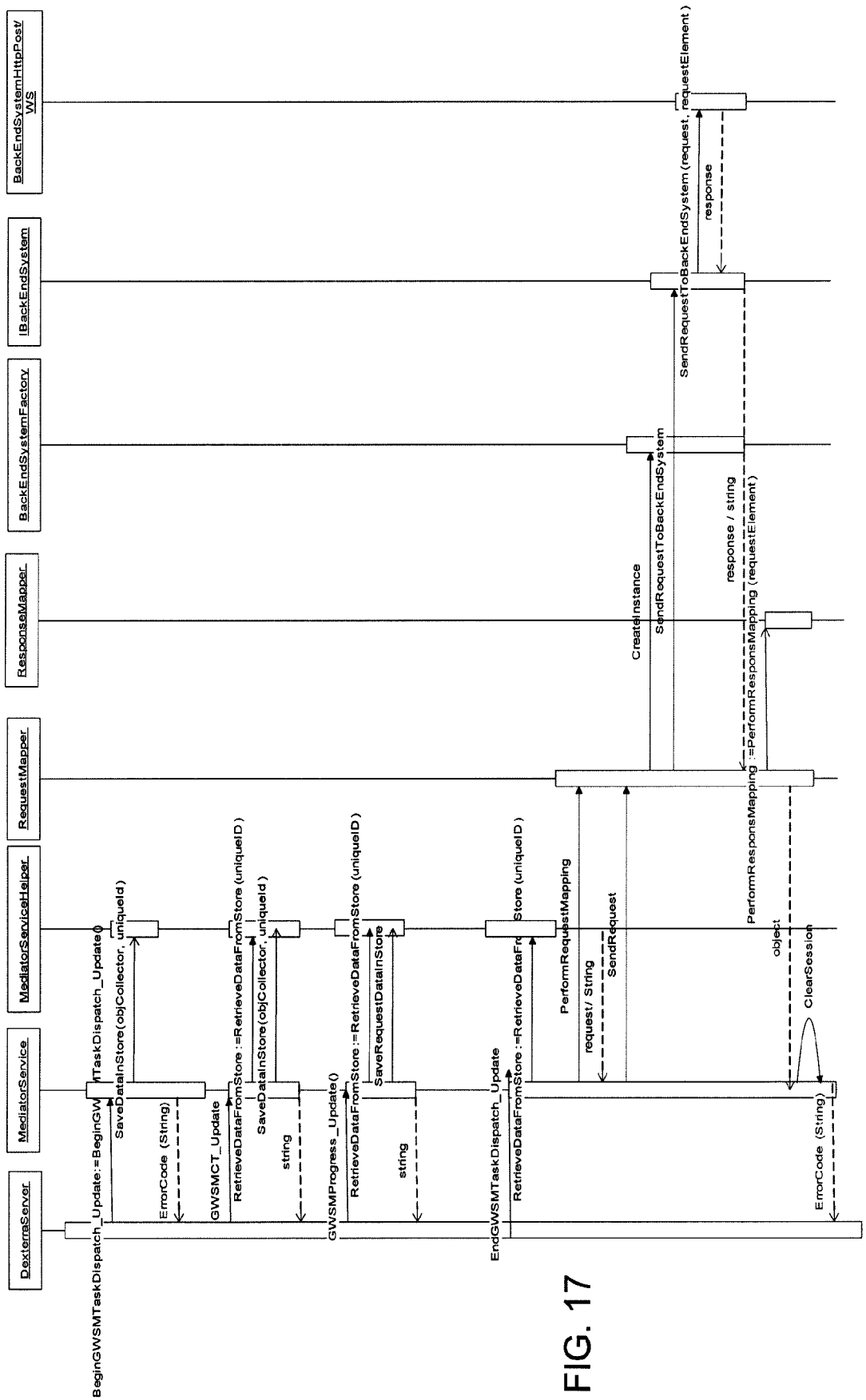
FIG. 17 is a process flowchart illustrating the operations of an upload request interaction in the systems of FIG. 1, FIG. 2, and FIG. 3, or other systems for providing a configurable adaptor for mediating systems.

FIG. 17 is a process flowchart illustrating the operations of an upload request process in the systems of FIG. 1, FIG. 2, and FIG. 3, or other systems for providing a configurable adaptor for mediating systems. In FIG. 17 the server may refer to the server A 210A and the backend system may refer to the server B 210B.

Figure 18:
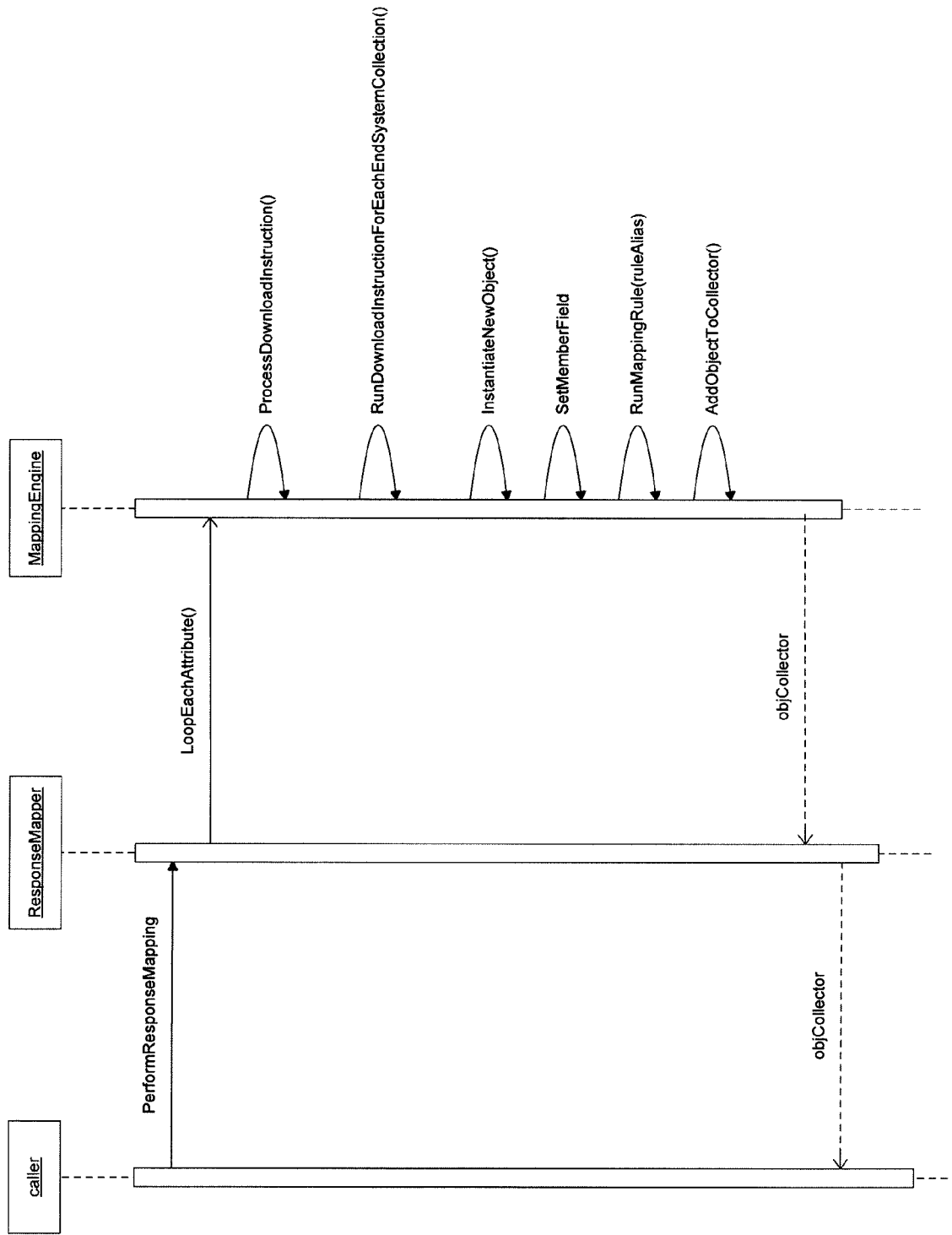
FIG. 18 is a process flowchart illustrating exemplary methods used in the operation of an upload request interaction in the systems of FIG. 1, FIG. 2, and FIG. 3, or other systems for providing a configurable adaptor for mediating systems.

FIG. 18 is a process flowchart illustrating exemplary methods used in the operation of an upload request process in the systems of FIG. 1, FIG. 2, and FIG. 3, or other systems for providing a configurable adaptor for mediating systems. FIG. 18 may demonstrate the methods that may be called by the adaptor 140 when performing a data mapping of a request from the server A 210A to the server B 210B.

Figure 19:
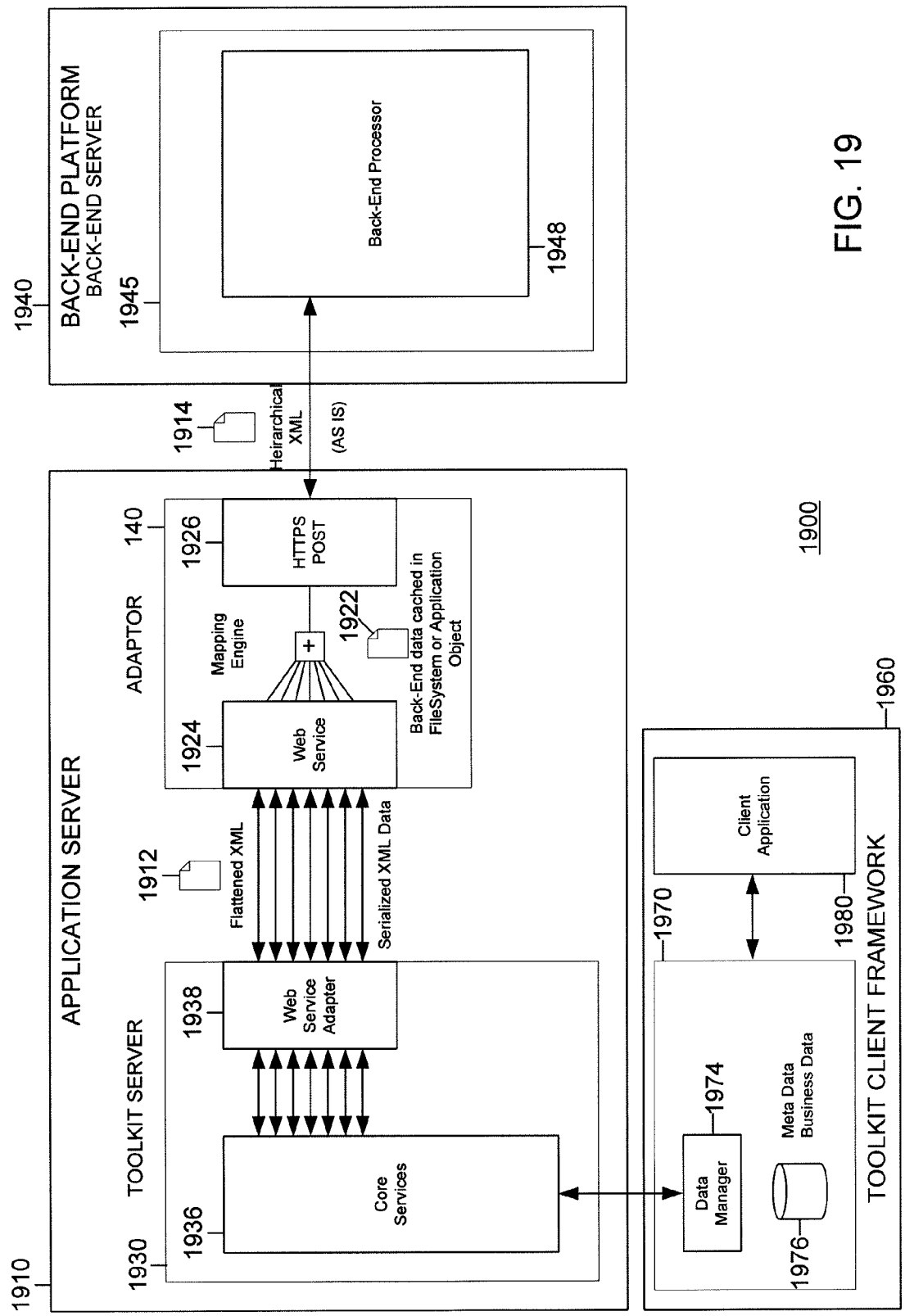
FIG. 19 is a block diagram illustrating an implementation of a configurable adaptor in a system including an application server platform and a back-end platform.

FIG. 19 is a block diagram illustrating an implementation of a configurable adaptor in a system 1900 including an application server 1910 and a back-end platform 1940. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 1900 may include an application server 1910, a back-end platform 1940, hierarchical XML 1914, and a toolkit client framework 1960. The backend platform 1940 may include a backend server 1945. The backend server 1945 may include a backend processor 1948. The application server 1910 may include a toolkit server 1930, flattened XML 1912, and the adaptor 140. The toolkit server 1930 may include a core services 1936 and a web service adapter 1938. The adaptor 140 may include a web service 1924, a cached backend data 1922 and an HTTPS POST component 1926. The toolkit client framework 1960 may include the client application 1980 and the client data controller 1970. the client data controller 1970 may include a data manager 1974 and a data store 1976, such as a meta data business data 1940. In the system 1900 the adaptor builder 150 may be an auxiliary component which only interfaces with the adaptor 140 when the business logic or data schema changes.

In operation a user A 120A may interface with the toolkit client framework 1960, such as by requesting scheduling information from the back end platform 1940. The toolkit client framework 1960 may communicate the request to the toolkit server 1930. The toolkit server 1930 may communicate the request as flattened XML 1912 to the adaptor 140. The adaptor 140 may identify the interaction as a data request and may store the current state of the interaction in the session objects 1922. The adaptor 140 may then transform the data into a hierarchical XML file 1914, so as to be compatible with the backend platform 1940. The adaptor 140 may then communicate the hierarchical XML file 1914 to the backend platform 1940.

The backend server 1945 may retrieve the requested data and communicate it to the adaptor 140 as hierarchical XML 1914. The adaptor 140 may verify the state of the current interaction with the session objects 1922. If the system 1900 enters an invalid state the adaptor 140 may communicate an error message to the toolkit server 1930 which then may be communicated to the toolkit client framework 1960. The adaptor 140 may then transform the hierarchical XML 1914 into flattened XML 1912 so as to be compatible with the toolkit server 1930. The adaptor 140 may then communicate the flattened XML 1912 to the toolkit server 1930. The toolkit server 1930 may in turn communicate the flattened XML 1912 to the toolkit client framework 1960, which may display the data to the user A 120A.

Figure 20:
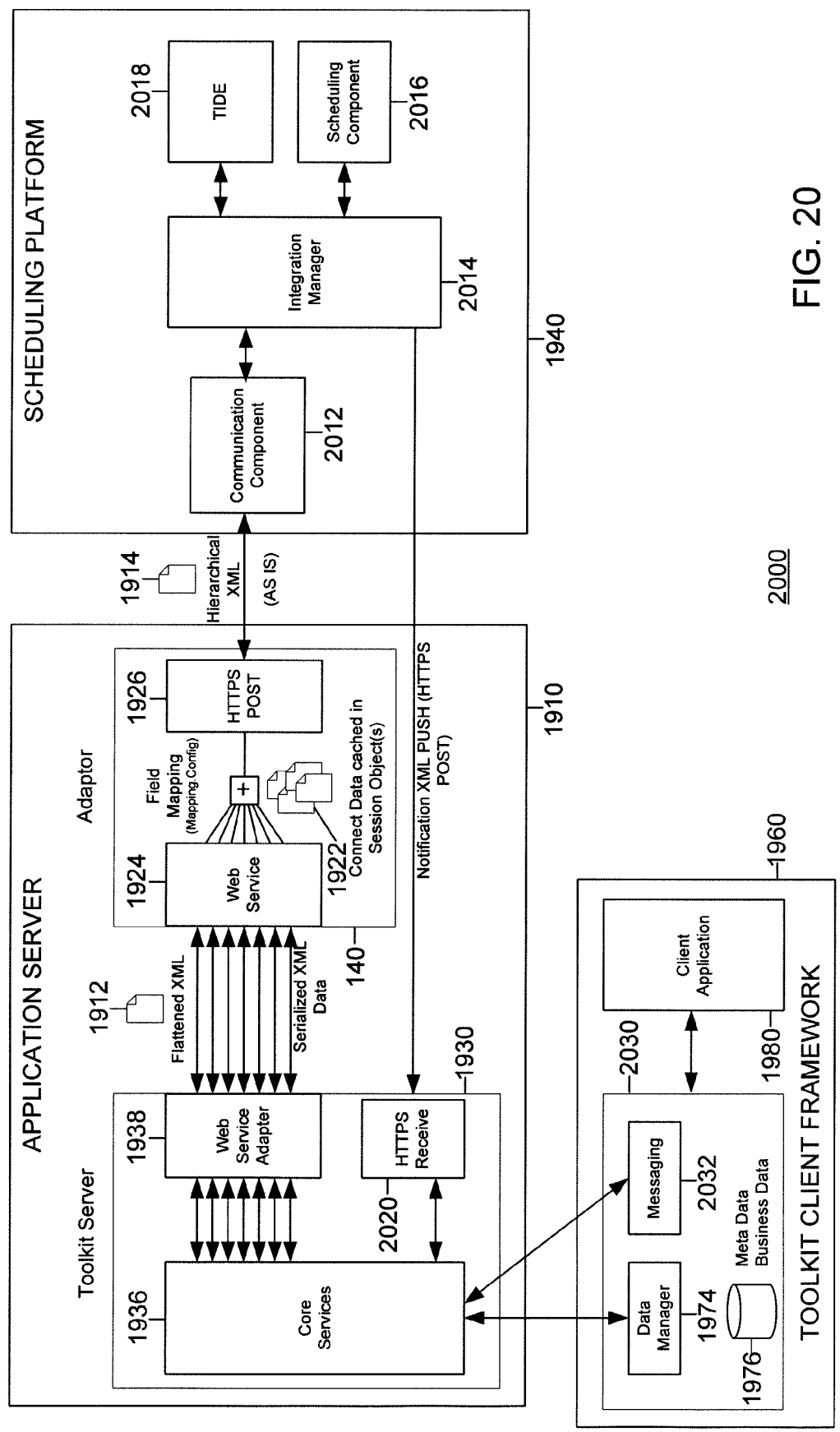
FIG. 20 is a block diagram illustrating an implementation of a configurable adaptor in a system including a toolkit client framework and a toolkit server.

FIG. 20 illustrates a system 2000 implementing a configurable adaptor 140 in a system including an application server 1910 and a scheduling server 1940. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 2000 may include the scheduling server 1940, such as a CLICKSCHEDULE® server, an application server 1910, such as a DEXTERRA® server, a toolkit client framework 1960, such as a DEXTERRA® toolkit framework, flattened XML 1912, and hierarchical XML 1914. The scheduling server 1940 may include a communication component 2012, such as a FMC-CONNECT ASP component, an integration manager component 2014, such as a CLICKSCHEDULE® integration manager component, a TIDE component 2018, and a scheduling system 2016, such as a CLICKSCHEDULE® component.

The application server 1910 may include an adaptor 140 and a toolkit server 1930. The adaptor 140 may include a web service 1924, session data 422, and an secure HTTP ("HTTPS") post component 426. The toolkit server 1930 may include a web service adaptor 1938, such as a DEXTERRA® web service adaptor, a HTTPS receive component 2020, and a core services component 1936, such as a DEXTERRA CONCERT® core services component. The toolkit client framework 1960 may include a toolkit application 1980 and a data application 1970. The data application 1970 may include a data manager 1974, a messaging component 2032 and a data store 1976, such as a meta data business data store. In the system 2000 the adaptor builder 150 may be an auxiliary component which only interfaces with the adaptor 140 when the business logic or data schema changes.

In operation a user may interface with the toolkit client framework 1960, such as by requesting scheduling information from the scheduling system 1940. The toolkit client framework 1960 may communicate the request to the toolkit server 1930. The toolkit server 1930 may communicate the request as flattened XML 1912 to the adaptor 140. The adaptor 140 may identify the interaction as a data request and may store the current state of the interaction in the session objects 1922. The adaptor 140 may then transform the data into a hierarchical XML file 1914, so as to be compatible with the scheduling system 1940. The adaptor 140 may then communicate the hierarchical XML file 1914 to the scheduling system 1940.

The scheduling system 1940 may retrieve the requested data and communicate it to the adaptor 140 as hierarchical XML 1914. The adaptor 140 may verify the state of the current interaction with the session objects 1922. If the system 1900 enters an invalid state the adaptor 140 may communicate an error message to the toolkit server 1930 which then may be communicated to the toolkit client framework 1960. The adaptor 140 may then transform the hierarchical XML 1914 into flattened XML 1912 so as to be compatible with the toolkit server 1930. The adaptor 140 may then communicate the flattened XML 1912 to the toolkit server 1930. The toolkit server 1930 may in turn communicate the flattened XML 1912 to the toolkit client framework 1960, which may display the data to the user.

Figure 21:
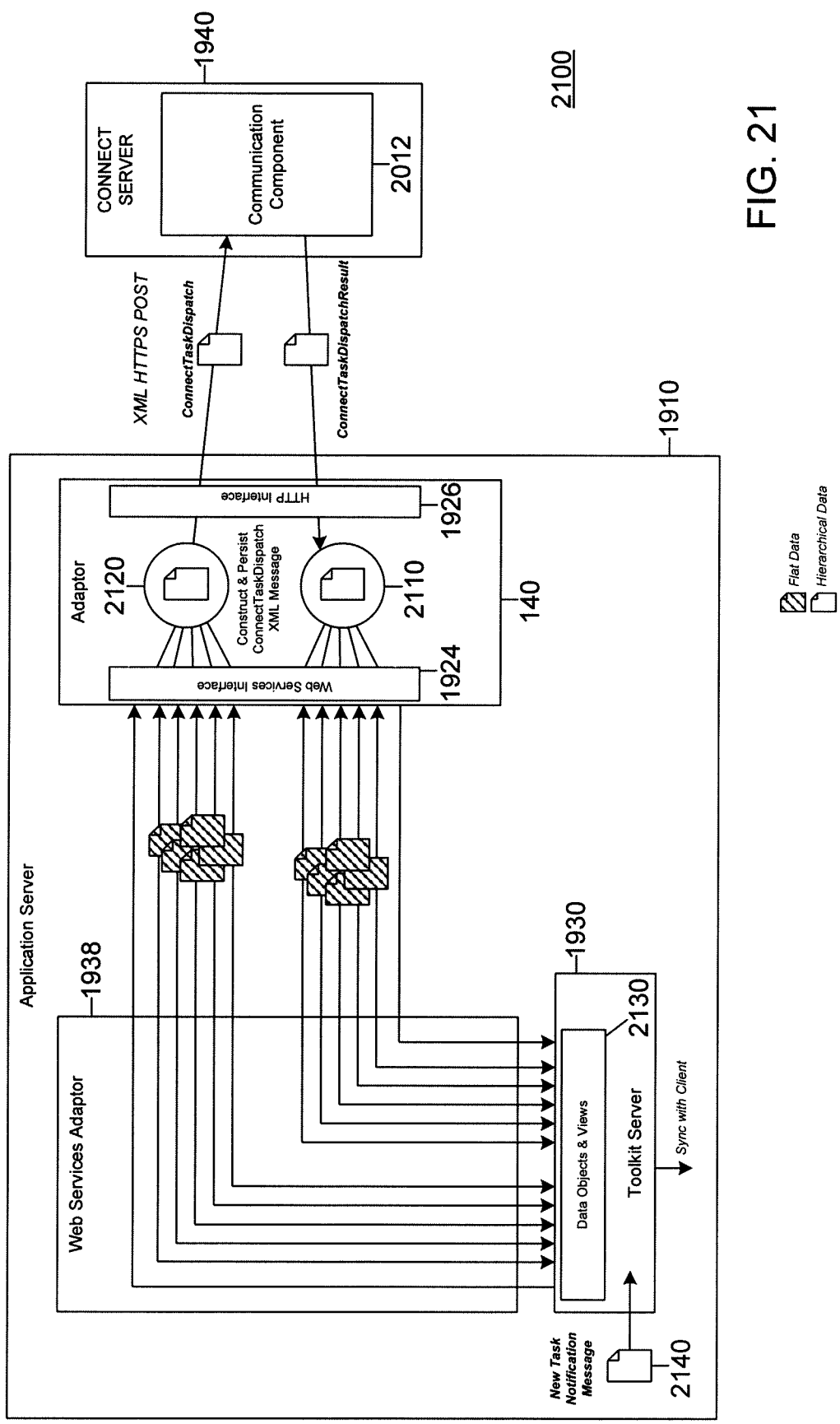
FIG. 21 is a block diagram illustrating data flow in an implementation of a configurable adaptor in a system including an application server platform and a scheduling platform.

FIG. 21 illustrates data flow in a system 2100 implementing a configurable adaptor 140 in a system including an application server 1910 and a scheduling system 1940. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 2100 may include an application server 1910, such as a DEXTERRA® application server, and a scheduling system 1940, such as a CLICKSCHEDULE® system. The application server 410 may include an adaptor 140, a web services adaptor 1938, such as a DEXTERRA® web services adaptor, a toolkit server 1910, and a notification message 2140. The adaptor 140 may include an outbound message processor 2120, an inbound message processor 2110, a web services interface 1924 and an HTTP interface 1948. The toolkit server 1910 may include a data store 2130. The scheduling system 1940 may include a communication component 2012, such as a FMC-CONNECT ASP component.

In operation a new task notification message 2140, such as a ticket of work ("TOW") message may be received by the toolkit server 1910. The toolkit server 1910 may communicate the message, as flat data, to the web services interface 1924 of the adaptor 140 via the web services adaptor 1938. The adaptor 140 may process the message through the inbound message processor 2120. The inbound message processor 2120 may process the message, such as transform it into a data format compatible with the scheduling system 1940. The adaptor 140 may then communicate the message, via the HTTP interface 1948, to the scheduling system 1940.

The scheduling system 1940 may retrieve the data requested by the message and may communicate the data, as hierarchical data, to the adaptor 140. The adaptor 140 may receive the hierarchical data via the HTTP interface 1926. The inbound message processor 2110 may determine the state and may process the message, such as by transforming the message into a format compatible with the toolkit server 1910. The adaptor 140 may then communicate the message, as flat data, to the toolkit server 1910 via the web services adaptor 1938. The toolkit server 1910 may then sync the data with the client, such as the web application A 220A.

Figure 22:
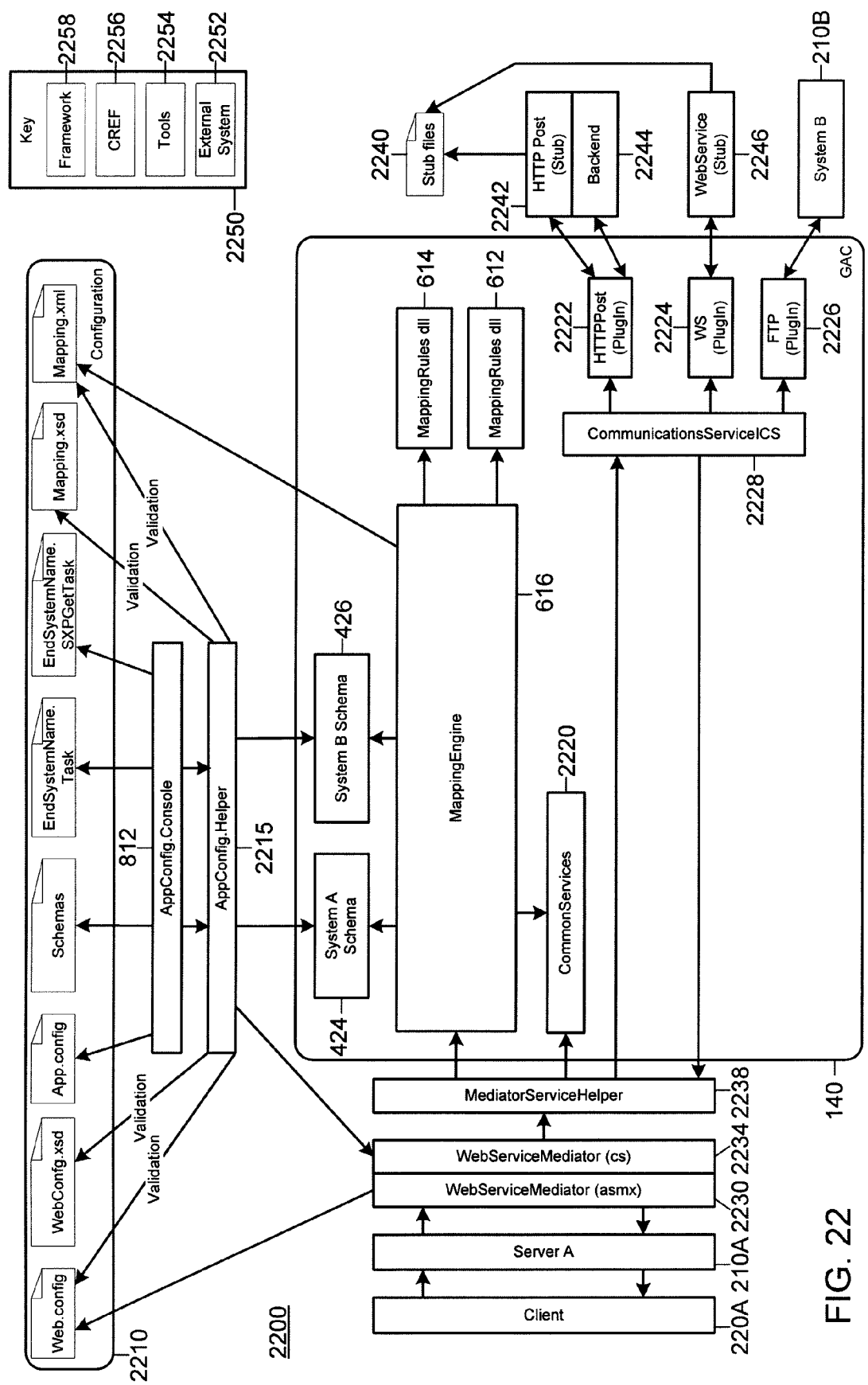
FIG. 22 is a block diagram illustrating the components and configuration files in an implementation of a configurable adaptor in the systems of FIG. 1, FIG. 2, and FIG. 3, or other systems for providing a configurable adaptor for mediating systems.

FIG. 22 is a block diagram illustrating the components and configuration files in an implementation of a configurable adaptor in the systems of FIG. 1, FIG. 2, and FIG. 3, or other systems for providing a configurable adaptor for mediating systems. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 2200 may include a client A 220A, a server A 210A, configuration files 2210, adaptor 140, a web service mediator (asmx) 2230, a web service mediator (cs) 2234, a mediator service helper 2238, stub files 2240, HTTP Post 2242, backend 2244, web service 2246, a backend system 210B, a console application 612, a helper application 2215, and a key 2250. The configuration files may include one or more configuration files, such as a web configuration file, a schemas configuration file, a mapping configuration file and any other configuration files used by the system 100. The adaptor 140 may include a system A schema 424, a system B schema 426, a mapping engine 616, a mapping rules 614, a custom mapping rules 612, a common services 2220, a communication service 2228, an HTTP post 2222, a web service plug-in 2224, and a ftp plug-in 2226. The key 2250 may include the framework key 2258, the CREF key 2256, the tools key 2254, and the external system key 2252.

In operation, the console application 812 may process the configuration files 2210 and pass the processed configuration files into the adaptor 140. The processed schema files may be communicated into the system A schema 424 and the system B schema 426. The mapping configurations may be communicated into the mapping rules 612, 614. The client A 220A may pass a request to the server 210A for data residing on the system B 110B. The server A 210A may pass the request to the adaptor 140 via the web service mediator (asmx), and/or the web service mediator (cs), and/or the mediator service helper 2238. The adaptor 140 may then use the mapping engine 616, the system A schema 424 and the system B schema 426 to translate the message into the format of the system B 110B. The adaptor 140 may communicate the translated message to the system B 110B through the communication service 2228, the HTTP post plug-in 2222, the web service plug-in 2224, and/or the ftp plug-in 2226.

Figure 23:
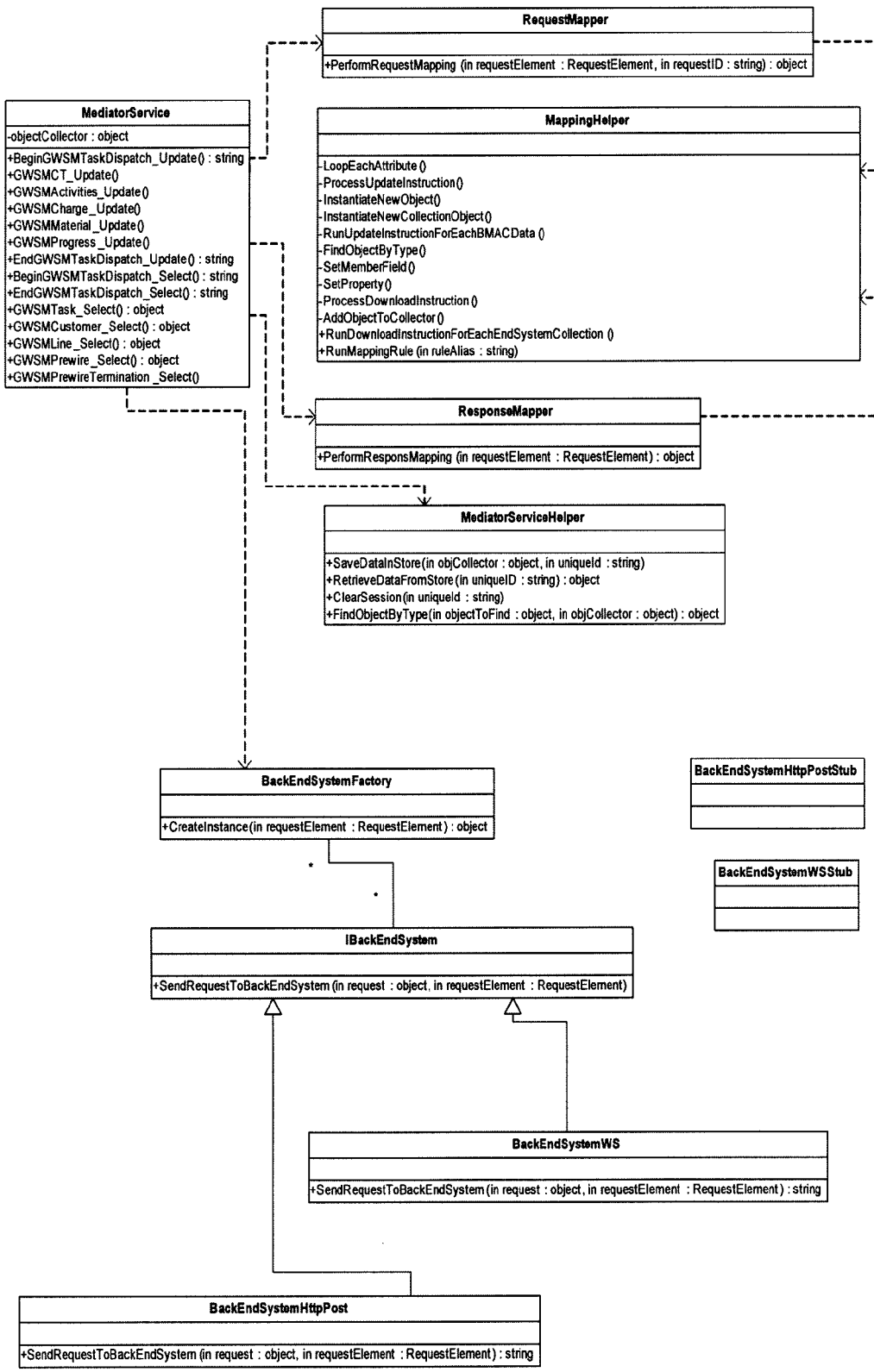
FIG. 23 is a object diagram illustrating an object layout in an implementation of the systems of FIG. 1, FIG. 2, and FIG. 3, or other systems for providing a configurable adaptor for mediating systems.

FIG. 23 is an object diagram illustrating an object layout in an implementation of the systems of FIG. 1, FIG. 2, and FIG. 3, or other systems for providing a configurable adaptor for mediating systems. The object layout may show the objects used by the system 100 to perform the response and request mapping.

Figure 24:
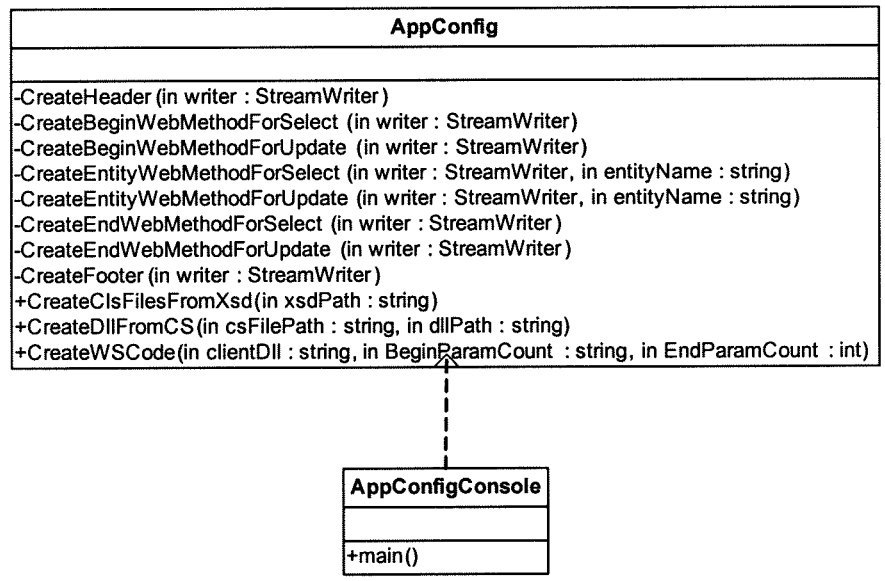
FIG. 24 is an object diagram illustrating an AppConfig table in an implementation of the systems of FIG. 1, FIG. 2, and FIG. 3, or other systems for providing a configurable adaptor for mediating systems.

FIG. 24 is an object diagram illustrating an AppConfig object in an implementation of the systems of FIG. 1, FIG. 2, and FIG. 3, or other systems for providing a configurable adaptor for mediating systems. The AppConfig object may be used to process the configuration files.

FIG. 25 illustrates the database schema in an implementation of the systems of FIG. 1, FIG. 2, and FIG. 3, or other systems for providing a configurable adaptor for mediating systems. The database layout may be used by the adaptor 140 to store data related to interactions.

FIG. 26 illustrates class objects used in an implementation of the systems of FIG. 1, FIG. 2, and FIG. 3, or other systems for providing a configurable adaptor for mediating systems. The class objects may be used by the adaptor 140 to execute specific data transformations between one component and another.

FIGS. 27A-H illustrate class objects used in an implementation of the systems of FIG. 1, FIG. 2, and FIG. 3, or other systems for providing a configurable adaptor for mediating systems. The class objects represent the data required by one of the components of a system in which the adaptor 140 may be used for data mediation and transformation.

Figure 28:
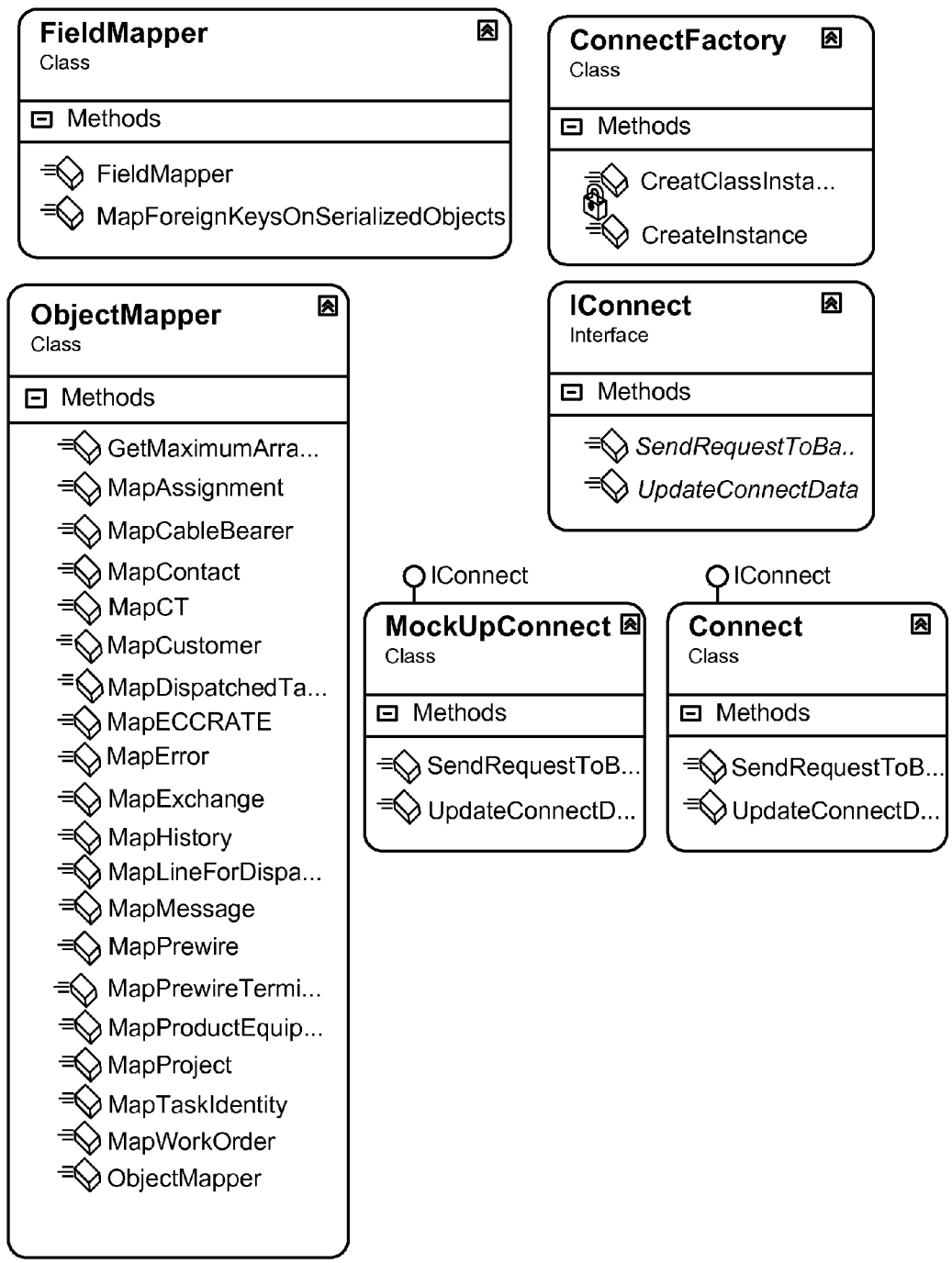
FIG. 28 is an illustration of class objects used in an implementation of the systems of FIG. 1, FIG. 2, and FIG. 3, or other systems for providing a configurable adaptor for mediating systems.

FIG. 28 illustrates class objects used in an implementation of the systems of FIG. 1, FIG. 2, and FIG. 3, or other systems for providing a configurable adaptor for mediating systems. The class objects may be used by the adaptor 140 to control the data transformation process between one component and another.

FIG. 29 lists the messages used to interact with data in an implementation of the systems of FIG. 1, FIG. 2, and FIG. 3, or other systems for providing a configurable adaptor for mediating systems. The messages may be identified in interaction data or in a message itself to instruct the adaptor 140, or other systems 110A-N, on accessing and/or storing data.

FIG. 30 lists the messages used to interact with data in an implementation of the systems of FIG. 1, FIG. 2, and FIG. 3, or other systems for providing a configurable adaptor for mediating systems. The messages may be identified in interaction data or in a message itself to instruct the adaptor 140 or other systems 110A-N on accessing and/or storing data.

Figure 31:
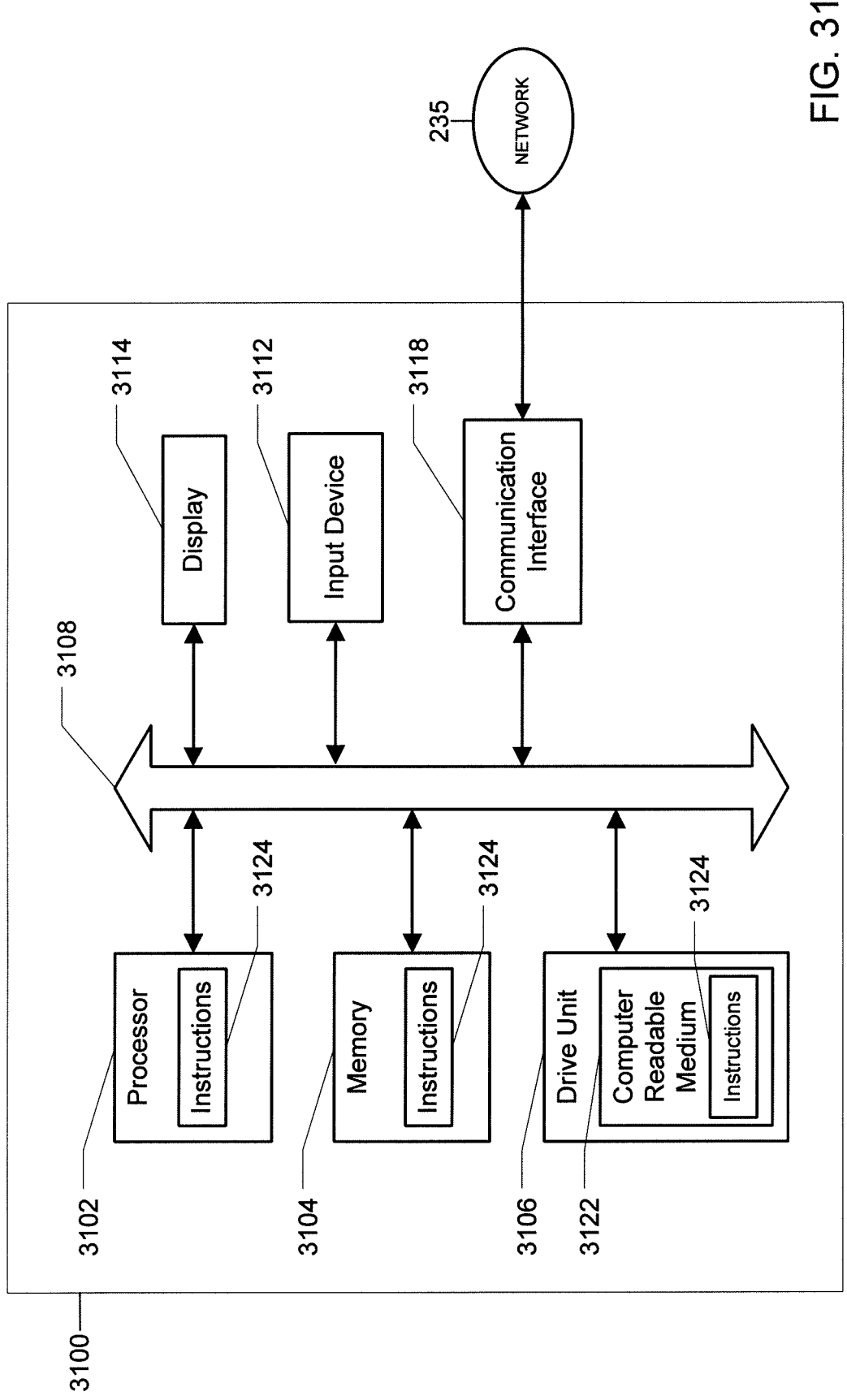
FIG. 31 is an illustration of a general computer system that may be used in the systems of FIG. 2, FIG. 3, FIG. 4, and FIG. 5, or other systems for providing a configurable adaptor for mediating systems.

FIG. 31 illustrates a general computer system 3100, which may represent a component servers 210A-N, adaptor/builder server 240, and client applications 220A-N, or any of the other computing devices referenced herein. The computer system 3100 may include a set of instructions 3124 that may be executed to cause the computer system 3100 to perform any one or more of the methods or computer based functions disclosed herein. The computer system 3100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 3100 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 3124 (sequential or otherwise) that specify actions to be taken by that machine. In a particular embodiment, the computer system 3100 may be implemented using electronic devices that provide voice, video or data communication. Further, while a single computer system 3100 may be illustrated, the term "system" shall also be taken to include any collection of systems or subsystems that individually or jointly execute a set, or multiple sets, of instructions to perform one or more computer functions.

As illustrated in FIG. 31, the computer system 3100 may include a processor 3102, such as, a central processing unit (CPU), a graphics processing unit (GPU), or both. The processor 3102 may be a component in a variety of systems. For example, the processor 3102 may be part of a standard personal computer or a workstation. The processor 3102 may be one or more general processors, digital signal processors, application specific integrated circuits, field programmable gate arrays, servers, networks, digital circuits, analog circuits, combinations thereof, or other now known or later developed devices for analyzing and processing data. The processor 3102 may implement a software program, such as code generated manually (i.e., programmed).

The computer system 3100 may include a memory 3104 that can communicate via a bus 3108. The memory 3104 may be a main memory, a static memory, or a dynamic memory. The memory 3104 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 3104 may include a cache or random access memory for the processor 3102. Alternatively or in addition, the memory 3104 may be separate from the processor 3102, such as a cache memory of a processor, the system memory, or other memory. The memory 3104 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 3104 may be operable to store instructions 3124 executable by the processor 3102. The functions, acts or tasks illustrated in the figures or described herein may be performed by the programmed processor 3102 executing the instructions 3124 stored in the memory 3104. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 3100 may further include a display 3114, such as a liquid crystal display (LCD), an organic light emitting diode (OLED), a flat panel display, a solid state display, a cathode ray tube (CRT), a projector, a printer or other now known or later developed display device for outputting determined information. The display 3114 may act as an interface for the user to see the functioning of the processor 3102, or specifically as an interface with the software stored in the memory 3104 or in the drive unit 3106.

Additionally, the computer system 3100 may include an input device 3112 configured to allow a user to interact with any of the components of system 3100. The input device 3112 may be a number pad, a keyboard, or a cursor control device, such as a mouse, or a joystick, touch screen display, remote control or any other device operative to interact with the system 3100.

The computer system 3100 may also include a disk or optical drive unit 3106. The disk drive unit 3106 may include a computer-readable medium 3122 in which one or more sets of instructions 3124, e.g. software, can be embedded. Further, the instructions 3124 may perform one or more of the methods or logic as described herein. The instructions 3124 may reside completely, or at least partially, within the memory 3104 and/or within the processor 3102 during execution by the computer system 3100. The memory 3104 and the processor 3102 also may include computer-readable media as discussed above.

The present disclosure contemplates a computer-readable medium 3122 that includes instructions 3124 or receives and executes instructions 3124 responsive to a propagated signal; so that a device connected to a network 235 may communicate voice, video, audio, images or any other data over the network 235. Further, the instructions 3124 may be transmitted or received over the network 235 via a communication interface 3118. The communication interface 3118 may be a part of the processor 3102 or may be a separate component. The communication interface 3118 may be created in software or may be a physical connection in hardware. The communication interface 3118 may be configured to connect with a network 235, external media, the display 3114, or any other components in system 3100, or combinations thereof. The connection with the network 235 may be a physical connection, such as a wired Ethernet connection or may be established wirelessly as discussed below. Likewise, the additional connections with other components of the system 3100 may be physical connections or may be established wirelessly. In the case of a service provider server 240 or the content provider servers 110A-N, the servers may communicate with users 120A-N through the communication interface 3118.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 3122 may be a single medium, or the computer-readable medium 3122 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 3122 may include a solid-state memory such as a memory card or other package that houses one or more non-volatile read-only memories. The computer-readable medium 3122 also may be a random access memory or other volatile re-writable memory. Additionally, the computer-readable medium 3122 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method for mediating communications between a plurality of systems, the method comprising:
    receiving a message from a first system using a first message format specific to a format of the first system wherein the message is to be communicated to a second system using a second message format specific to a format of the second system, further wherein the message is part of an interaction between the first system and the second system;
    identifying an interaction item associated with the interaction, wherein the interaction comprises a plurality of states that comprise a plurality of steps of a business logic of the interaction;
    determining a current state of the interaction based on the message and the interaction item;
    determining a data transformation of the message from the first message format specific to the format of the first system to the second message format specific to the format of the second system based on the current state of the interaction, wherein different states of the interaction are associated with different data transformations of messages between the first and the second system;
    transforming the message based on the current state of the interaction using a binary representation of the first message format specific to the format of the first system and the second message format specific to the format of the second system and the data transformation; and
    communicating the transformed message to the second system.

2. The method of claim 1 wherein the binary representations of the data schemas each comprises a plurality of class objects.

3. The method of claim 1 further comprising updating the state of the interaction.

4. The method of claim 1 further comprising communicating the transformed message to a third system.

5. The method of claim 1, wherein determining the current state comprises determining a current step of the business logic from a data store storing the current step.

6. The method of claim 1 further comprising:
    modifying the data transformation based on a modification of the first or second message formats.

7. A system for mediating communications between a plurality of systems, the system comprising:
    means for receiving a message from a first system using a first message format specific to a format of the first system wherein the message is to be communicated to a second system using a second message format specific to a format of the second system, further wherein the message is part of an interaction between the first system and the second system;
    means for identifying an interaction item associated with the interaction, wherein the interaction comprises a plurality of states that comprise a plurality of steps of a business logic of the interaction;
    means for determining a current state of the interaction based on the message and the interaction item;
    means for determining a data transformation of the message from the first message format specific to the format of the first system to the second message format specific to the format of the second system based on the current state of the interaction, wherein different states of the interaction are associated with different data transformations of messages between the first and the second system;
    means for transforming the message based on the current state of the interaction using a binary representation of the first message format specific to the format of the first system and the second message format specific to the format of the second system and the data transformation; and
    means for communicating the transformed message to the second system.

8. The system of claim 7 wherein the data transformation is described in an XML file.

9. The system of claim 7 further comprising means for updating the state of the interaction.

10. The system of claim 7 further comprising means for communicating the transformed message to a third system.

11. The system of claim 7, wherein the means for determining the current state determines the current state by retrieving a current step of the business logic from a data store storing the current step.

12. At least one non-transitory computer readable medium storing machine readable instructions that when executed by at least one computer system perform a method for mediating communications between a plurality of systems, the method comprising:
    storing a representation of a business logic including a plurality of steps to be performed between a first system and a second system;
    receiving a message from the first system using a first message format specific to a format of the first system wherein the message is to be communicated to the second system using a second message format specific to a format of the second system;
    determining whether the message is part of the business logic;
    based on determining the message is part of the business logic, determining a current step of the business logic;
    determining a data transformation of the message from the first message format specific to the format of the first system to the second message format specific to the format of the second system based on the current step of the business logic, wherein different steps of the business logic are associated with different data transformations of messages between the first and the second system;
    transforming the message based on the current step of the business logic using the data transformation; and
    communicating the transformed message to the second system.

13. The at least one non-transitory computer readable medium of claim 12, wherein the method further comprises:
   maintaining steps of the business logic in a data store; and
   updating a current step of the business logic in the data store as the business logic is performed.

14. The at least one non-transitory computer readable medium of claim 13, wherein determining a current step of the business logic comprises determining the current step from the updated current step in the data store.

15. A method for mediating communications between a plurality of systems, the method comprising:
   receiving a message from a first system using a first message format specific to a format of the first system wherein the message is to be communicated to a second system using a second message format specific to a format of the second system, further wherein the message is part of an interaction between the first system and the second system;
   identifying an interaction item associated with the interaction, wherein the interaction comprises a plurality of states that comprise a plurality of steps of a business logic of the interaction;
   storing the plurality of states of the interaction;
   determining a current state of the interaction based on the message and the interaction item;
   identifying the current state of the interaction from the plurality of stored states;
   for each of the stored states, storing a data transformation of the message from the first message format specific to the format of the first system to the second message format specific to the format of the second system, wherein different states of the interaction are associated with different data transformations of messages between the first and the second system;
   identifying a data transformation of the message from the stored data transformations based on the current state of the interaction;
   transforming the message based on the current state of the interaction using a binary representation of the first message format specific to the format of the first system and the second message format specific to the format of the second system and the identified data transformation; and
   communicating the transformed message to the second system.

\* \* \* \* \*